(12) United States Patent
Aoyama et al.

(10) Patent No.: US 8,193,366 B2
(45) Date of Patent: Jun. 5, 2012

(54) CYANINE COMPOUNDS

(75) Inventors: Yohei Aoyama, Tokyo (JP); Koichi Shigeno, Tokyo (JP)

(73) Assignee: Adeka Corporation, Tokyo (JP)

( * ) Notice: Subject to any disclaimer, the term of this patent is extended or adjusted under 35 U.S.C. 154(b) by 51 days.

(21) Appl. No.: 12/764,439

(22) Filed: Apr. 21, 2010

(65) Prior Publication Data

US 2010/0204474 A1    Aug. 12, 2010

Related U.S. Application Data

(62) Division of application No. 11/886,626, filed as application No. PCT/JP2006/307093 on Apr. 4, 2006, now Pat. No. 7,745,632.

(30) Foreign Application Priority Data

Apr. 5, 2005 (JP) .................................. 2005-108339
Jan. 11, 2006 (JP) .................................. 2006-004215

(51) Int. Cl.
*C07F 15/02* (2006.01)
(52) U.S. Cl. ...................................... 548/101; 548/402
(58) Field of Classification Search .................. 548/101, 548/402
See application file for complete search history.

(56) References Cited

U.S. PATENT DOCUMENTS

2003/0224293 A1    12/2003 Oya et al.

FOREIGN PATENT DOCUMENTS

| EP | 1895335 | 3/2008 |
|---|---|---|
| JP | 61-126555 | 6/1986 |
| JP | 2001-47740 | 2/2001 |
| JP | 2003-171571 | 6/2003 |
| JP | 2004-195765 | 7/2004 |
| WO | WO 2006/035555 | 4/2006 |
| WO | 2006-137272 | 12/2006 |

OTHER PUBLICATIONS

Extended European Search Report in corresponding European Application No. EP 06 73 1041 mailed Sep. 29, 2010.

*Primary Examiner* — Joseph Kosack
(74) *Attorney, Agent, or Firm* — Young & Thompson

(57) ABSTRACT

A cyanine compound represented by the general formula (I), (VI) or (VII):

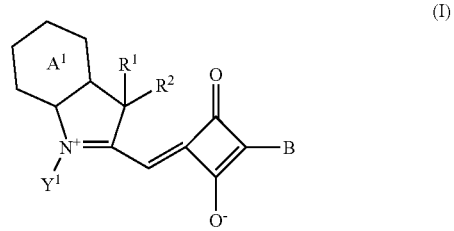

(I)

wherein ring-$A^1$ is an optionally substituted benzene or naphthalene ring; B is a group represented by the general formula (II) or (III); $R^1$ is a hydrogen atom, a halogen atom, an alkyl group having 1 to 8 carbon atoms, an alkoxy group having 1 to 8 carbon atoms, or an aryl group having 6 to 30 carbon atoms; $R^2$ is a substituent represented by the general formula (IV); and $Y^1$ is a hydrogen atom, an organic group having 1 to 30 carbon atoms, or a substituent represented by the general formula (IV):

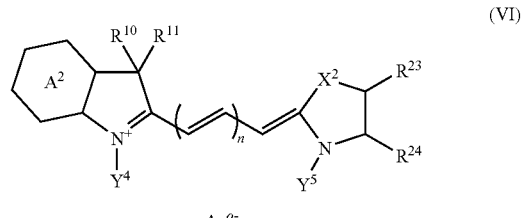

(VI)

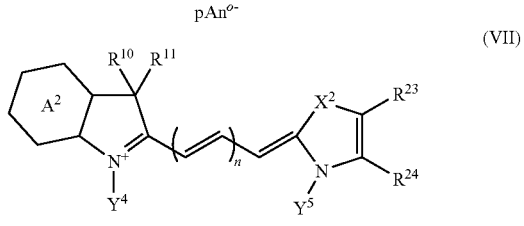

(VII)

wherein ring-$A^2$ is the same as the ring-$A^1$ in the general formula (I); $Y^4$ and $Y^5$ each are independently the same as $Y^1$ in the general formula (I); $X^2$ is the same as $X^1$ in the general formula (I); $R^{10}$ is the same as $R^1$ in the general formula (I); $R^{11}$ is the same as $R^2$ in the general formula (I); $R^{23}$ and $R^{24}$ are the same as $R^{21}$ and $R^{22}$ in the formulas (II) and (III); n is an integer of 0 to 6; the polymethine chain may have a substituent; $An^{q-}$ is a q-valent anion; q is 1 or 2; and p is a factor keeping the neutrality of charge.

3 Claims, No Drawings

CYANINE COMPOUNDS

FIELD OF THE INVENTION

The present invention relates to a novel cyanine compound, an optical filter, and an optical recording material. The cyanine compound is useful as an optical element and the like, especially as a light absorber for optical filters of image display devices, and as an optical recording agent contained in an optical recording material which is used for optical recording layers of optical recording media recorded and reproduced with laser light.

BACKGROUND OF THE INVENTION

A compound having a large absorption intensity in the range from 500 nm to 700 nm, especially a compound having a maximum absorption (λmax) in the range from 550 nm to 620 nm has been used as an optical element in an optical recording layer of optical recording media such as DVD-Rs, or in an optical filter for image display devices such as liquid crystal displays (LCDs), plasma display panels (PDPs), electroluminescence displays (ELDs), cathode ray tubes (CRTs), fluorescent display tubes, and field emission displays.

As the foregoing optical element, for example, in Patent Documents 1 and 2 described below, a cyanine compound containing a metallocene-bonded group has been reported. However, the optical element, which is used in an optical filter for image display devices and an optical recording material with laser light, is expected to have further improvement in such performances as lightfastness and solubility.

Patent Document 1: Japanese Patent Laid-Open Publication No. 2003-171571

Patent Document 2: WO 2006/035555A

SUMMARY OF THE INVENTION

Therefore, an object of the present invention is to provide a compound excellent in solubility and lightfastness and useful as an optical element which is particularly suitably used for an optical filter for image display devices and an optical recording material with laser light.

The present inventors have made intensive studies and found that a specific cyanine compound having a metallocene-bonded group at a specific position exhibits excellent solubility and lightfastness.

The present invention has been accomplished based on the above finding and provides a cyanine compound represented by the general formula (I), (VI), or (VII), an optical filter that contains the cyanine compound, and an optical recording material that contains the cyanine compound and is used for an optical recording layer of optical recording media having the optical recording layer formed on a base.

[Chemical 1]

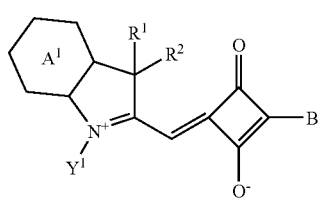

(I)

wherein ring-$A^1$ is an optionally substituted benzene or naphthalene ring; B is a group represented by the general formula (II) or (III); $R^1$ is a hydrogen atom, a halogen atom, an alkyl group having 1 to 8 carbon atoms, an alkoxy group having 1 to 8 carbon atoms, or an aryl group having 6 to 30 carbon atoms; $R^2$ is a substituent represented by the general formula (IV); and $Y^1$ is a hydrogen atom, an organic group having 1 to 30 carbon atoms, or a substituent represented by the general formula (IV):

[Chemical 2]

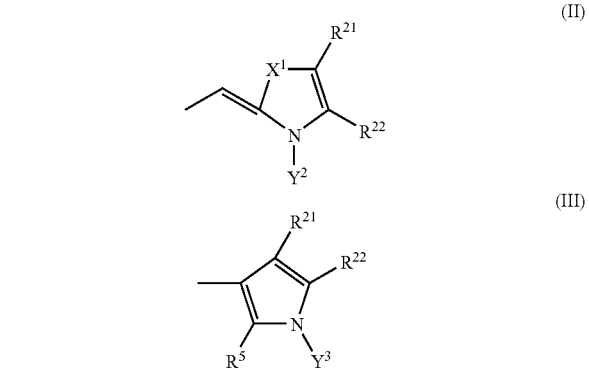

in the general formula (II), $Y^2$ is the same group as $Y^1$ in the general formula (I); $X^1$ is an oxygen atom, a sulfur atom, a selenium atom, —$CR^3R^4$—, —NH—, or —NY'—; each of $R^3$ and $R^4$ is independently an alkyl group having 1 to 4 carbon atoms, a group represented by the general formula (IV), a group represented by the general formula (V) or a group forming a 3 to 10 membered ring by linking together; Y' is an organic group having 1 to 30 carbon atoms; each of $R^{21}$ and $R^{22}$ is independently a hydrogen atom, a halogen atom, an alkyl group having 1 to 8 carbon atoms, an alkoxy group having 1 to 8 carbon atoms, or an aryl group having 6 to 30 carbon atoms; and $R^{21}$ and $R^{22}$ may form a ring structure by linking together:

in the general formula (III), $R^5$ is the same group as $R^1$ in the general formula (I); $Y^3$ is the same group as $Y^1$ in the general formula (I); and $R^{21}$ and $R^{22}$ are the same groups as $R^{21}$ and $R^{22}$ in the general formula (II):

[Chemical 3]

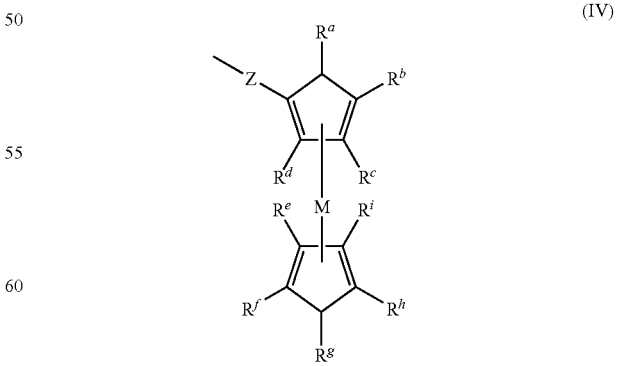

wherein each of $R^a$ to $R^i$ is independently a hydrogen atom or an alkyl group having 1 to 4 carbon atoms; the methylene group in the alkyl group may be replaced by —O— or —CO—; Z is a direct bond or an optionally substituted alkylene group having 1 to 8 carbon atoms; the methylene group in the alkylene group may be replaced by —O—, —S—, —CO—, —COO—, —OCO—, —SO$_2$—, —NH—, —CONH—, —NHCO—, —N=CH—, or —CH=CH—; and M is Fe, Co, Ni, Ti, Cu, Zn, Zr, Cr, Mo, Os, Mn, Ru, Sn, Pd, Rh, Pt, or Ir:

[Chemical 4]

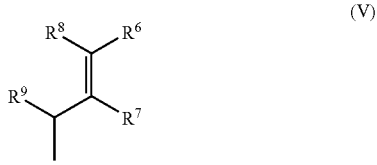

(V)

wherein each of $R^6$ to $R^9$ is independently a hydrogen atom, a halogen atom, an alkyl group having 1 to 4 carbon atoms optionally substituted by a halogen atom, or an alkoxy group having 1 to 4 carbon atoms optionally substituted by a halogen atom; and $R^6$ and $R^7$ may form a ring structure by linking together.

[Chemical 5]

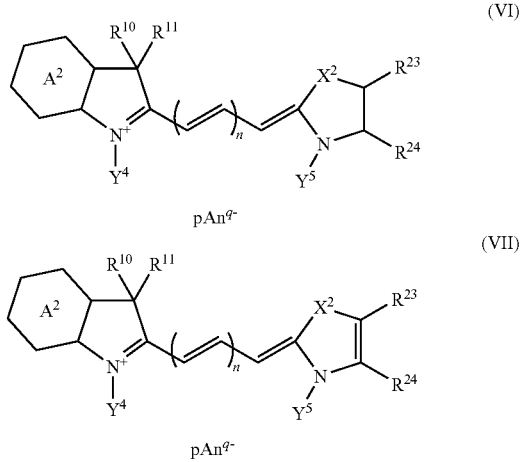

wherein ring-$A^2$ is the same as the ring-$A^1$ in the general formula (I); $Y^4$ and $Y^5$ each are independently the same as $Y^1$ in the general formula (I); $X^2$ is the same as $X^1$ in the general formula (I); $R^{10}$ is the same as $R^1$ in the general formula (I); $R^{11}$ is the same as $R^2$ in the general formula (I); $R^{23}$ and $R^{24}$ are the same as $R^{21}$ and $R^{22}$ in the formulas (II) and (III); n is an integer of 0 to 6; the polymethine chain may have a substituent; $An^{q-}$ is a q-valent anion; q is 1 or 2; and p is a factor keeping the neutrality of charge.

DETAILED DESCRIPTION OF THE INVENTION

The cyanine compound of the present invention, and the optical filter and the optical recording material that contain the cyanine compound will be described in detail with reference to preferred embodiments below.

Firstly, the cyanine compound of the present invention represented by the general formula (I), (VI) or (VII) will be explained.

As the substituent of the optionally substituted benzene or naphthalene ring represented by ring-$A^1$ in the general formula (I) and ring-$A^2$ in the general formulas (VI) and (VII), there may be mentioned a halogen atom such as fluorine, chlorine, bromine, and iodine; an alkyl group (preferably an alkyl group having 1 to 8 carbon atoms) such as methyl, ethyl, propyl, isopropyl, butyl, sec-butyl, tert-butyl, isobutyl, amyl, isoamyl, tert-amyl, hexyl, cyclohexyl, heptyl, isoheptyl, tert-heptyl, n-octyl, iso-octyl, tert-octyl, and 2-ethylhexyl; a halogen substituted derivative of the foregoing alkyl group (preferably an alkyl group having 1 to 8 carbon atoms); an alkoxy group such as methoxy, ethoxy, isopropoxy, propoxy, butoxy, sec-butoxy, tert-butoxy, pentyloxy, isopentyloxy, hexyloxy, heptyloxy, octyloxy, and 2-ethylhexyloxy; a halogen substituted derivative of the foregoing alkoxy group; an alkylthio group (preferably an alkylthio group having 1 to 8 carbon atoms) such as methylthio, ethylthio, propylthio, isopropylthio, butylthio, sec-butylthio, and tert-butylthio; an aryl group (preferably an aryl group having 6 to 30 carbon atoms) such as phenyl, naphthyl, 2-methylphenyl, 3-methylphenyl, 4-methylphenyl, 4-vinylphenyl, 3-isopropylphenyl, 4-isopropylphenyl, 4-butylphenyl, 4-isobutylphenyl, 4-tert-butylphenyl, 4-hexylphenyl, 4-cyclohexylphenyl, 4-octylphenyl, 4-(2-ethylhexyl)phenyl, 4-stearylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4-ditert-butylphenyl, 2,5-ditert-butylphenyl, 2,6-ditert-butylphenyl, 2,4-ditert-pentylphenyl, 2,5-ditert-amylphenyl, 2,5-ditert-octylphenyl, 2,4-dicumylphenyl, cyclohexylphenyl, biphenyl, 2,4,5-trimethylphenyl, benzyl, phenethyl, 2-phenylpropan-2-yl, diphenylmethyl, triphenylmethyl, styryl, and cinnamyl; a nitro group; a cyano group; and others.

$R^1$ in the general formula (I), $R^{21}$ and $R^{22}$ in the general formulas (II) and (III), $R^5$ in the general formula (III), and $R^{10}$, $R^{23}$ and $R^{24}$ in the general formulas (VI) and (VII) each represent a halogen atom including fluorine, chlorine, bromine, and iodine. As the alkyl group having 1 to 8 carbon atoms represented by $R^1$, $R^5$, $R^{10}$, $R^{21}$, $R^{22}$, $R^{23}$, and $R^{24}$, there may be mentioned methyl, ethyl, propyl, isopropyl, butyl, sec-butyl, tert-butyl, isobutyl, amyl, isoamyl, tert-amyl, hexyl, cyclohexyl, heptyl, isoheptyl, tert-heptyl, n-octyl, iso-octyl, tert-octyl, 2-ethylhexyl and the like. As the alkoxy group having 1 to 8 carbon atoms represented by $R^1$, $R^5$, $R^{10}$, $R^{21}$, $R^{22}$, $R^{23}$, and $R^{24}$, there may be mentioned methyloxy, ethyloxy, isopropyloxy, propyloxy, butyloxy, pentyloxy, isopentyloxy, hexyloxy, heptyloxy, octyloxy, 2-ethylhexyloxy and the like. As the aryl group having 6 to 30 carbon atoms represented by $R^1$, $R^5$, $R^{10}$, $R^{21}$, $R^{22}$, $R^{23}$, and $R^{24}$, there may be mentioned phenyl, naphthyl, 2-methylphenyl, 3-methylphenyl, 4-methylphenyl, 4-vinylphenyl, 3-isopropylphenyl, 4-isopropylphenyl, 4-butylphenyl, 4-isobutylphenyl, 4-tert-butylphenyl, 4-hexylphenyl, 4-cyclohexylphenyl, 4-octylphenyl, 4-(2-ethylhexyl)phenyl, 4-stearylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4-ditert-butylphenyl, 2,5-ditert-butylphenyl, 2,6-ditert-butylphenyl, 2,4-ditert-pentylphenyl, 2,5-ditert-amylphenyl, 2,5-ditert-octylphenyl, 2,4-dicumylphenyl, cyclohexylphenyl, biphenyl, 2,4,5-trimethylphenyl, benzyl, phenethyl, 2-phenylpropane-2-yl, diphenylmethyl, triphenylmethyl, styryl, cinnamyl and the like. As the ring structure formed by linking $R^{21}$ and $R^{22}$ together, and $R^{23}$ and $R^{24}$ together, there may be mentioned such rings as benzene, naphthalene, anthracene, cyclobutene, cyclopentene, cyclohexene, cyclopentadiene, pyrrole, furan, thiophene, dihydropyrrole, pyridine, pyran, isoxazole, pyrazine, pyrimidine, pyridazine, pyrazole, isothiazole, imidazole, quinoline, and carbazole. These rings may be substituted by a halogen atom, an alkyl group, an alkoxy group, and others.

As the organic group having 1 to 30 carbon atoms represented by $Y^1$ in the general formula (I), $Y^2$ in the general formula (II), $Y^3$ in the general formula (III), and $Y^4$ and $Y^5$ in the general formulas (VI) and (VII), there may be mentioned, for example, an alkyl group such as methyl, ethyl, propyl, isopropyl, butyl, sec-butyl, tert-butyl, isobutyl, amyl, isoamyl, tert-amyl, hexyl, cyclohexyl, cyclohexylmethyl, 2-cyclohexylethyl, heptyl, isoheptyl, tert-heptyl, n-octyl, iso-octyl, tert-octyl, 2-ethylhexyl, nonyl, isononyl, decyl, dodecyl, tridecyl, tetradecyl, pentadecyl, hexadecyl, heptadecyl, and octadecyl; an alkenyl group such as vinyl, 1-methylethenyl, 2-methylethenyl, propenyl, butenyl, isobutenyl, pentenyl, hexenyl, heptenyl, octenyl, decenyl, pentadecenyl, and 1-phenylpropen-3-yl; an alkylaryl group such as phenyl, naphthyl, 2-methylphenyl, 3-methylphenyl, 4-methylphenyl, 4-vinylphenyl, 3-isopropylphenyl, 4-isopropylphenyl, 4-butylphenyl, 4-isobutylphenyl, 4-tert-butylphenyl, 4-hexylphenyl, 4-cyclohexylphenyl, 4-octylphenyl, 4-(2-ethylhexyl)phenyl, 4-stearylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4-ditert-butylphenyl, and cyclohexylphenyl; an arylalkyl group such as benzyl, phenethyl, 2-phenylpropan-2-yl, diphenylmethyl, triphenylmethyl, styryl, cinnamyl and the like; a group which is given by interposing the foregoing groups with an ether or thioether bonding, including, for example, 2-methoxyethyl, 3-methoxypropyl, 4-methoxybutyl, 2-butoxyethyl, methoxyethoxyethyl, methoxyethoxyethyl, 3-methoxybutyl, 2-phenoxyethyl, 3-phenoxypropyl, 2-methylthioethyl, 2-phenylthioethyl, and others.

As the alkyl group having 1 to 4 carbon atoms represented by $R^3$ and $R^4$ which are contained in $X^1$ in the general formula (II) and $X^2$ in the general formulas (VI) and (VII), there may be mentioned methyl, ethyl, propyl, isopropyl, butyl, sec-butyl, tert-butyl, isobutyl and the like. As the 3 to 10 membered ring formed by linking $R^3$ and $R^4$ together, there may be mentioned, cyclopropane-1,1-diyl, cyclobutane-1,1-diyl, 2,4-dimethylcyclobutane-1,1-diyl, 3-dimethylcyclobutane-1,1-diyl, cyclopentane-1,1-diyl, cyclohexane-1,1-diyl, tetrahydropyran-4,4-diyl, thian-4,4-diyl, piperidine-4,4-diyl, N-substituted piperidine-4,4-diyl, morpholine-2,2-diyl, morpholine-3,3-diyl, N-substituted morpholine-2,2-diyl, N-substituted morpholine-3,3-diyl and the like. As the N-substituent thereof, there may be mentioned a halogen atom such as fluorine, chlorine, bromine, and iodine; an alkyl group such as methyl, ethyl, propyl, isopropyl, butyl, sec-butyl, tert-butyl, isobutyl, amyl, isoamyl, tert-amyl, hexyl, cyclohexyl, heptyl, isoheptyl, tert-heptyl, n-octyl, iso-octyl, tert-octyl, and 2-ethylhexyl; a halogen substituted derivative of the foregoing alkyl group; an alkoxy group such as methoxy, ethoxy, isopropoxy, propoxy, butoxy, sec-butoxy, tert-butoxy, pentyloxy, isopentyloxy, hexyloxy, heptyloxy, octyloxy, and 2-ethylhexyloxy; a halogen substituted derivative of the foregoing alkoxy group; an alkylthio group such as methylthio, ethylthio, propylthio, isopropylthio, butylthio, sec-butylthio, and tert-butylthio; a nitro group; a cyano group; and others. As the organic group having 1 to 30 carbon atoms represented by Y' which is contained in $X^1$ and $X^2$, there may be mentioned a group similar to $Y^1$ in the general formula (I).

As the alkyl group having 1 to 4 carbon atoms represented by $R^a$ to $R^i$ in the general formula (IV), there may be mentioned methyl, ethyl, propyl, isopropyl, butyl, sec-butyl, tert-butyl, isobutyl and the like. As the group given by replacing the methylene group in the foregoing alkyl group by —O—, there may be mentioned methoxy, ethoxy, propyloxy, isopropyloxy, methoxymethyl, ethoxymethyl, 2-methoxyethyl and the like. As the group given by replacing the methylene group in the foregoing alkyl group by —CO—, there may be mentioned acetyl, 1-carbonylethyl, acetylmethyl, 1-carbonylpropyl, 2-oxobutyl, 2-acetylethyl, 1-carbonylisopropyl and the like. As the optionally substituted alkylene group having 1 to 8 carbon atoms represented by Z in the general formula (IV), there may be mentioned methylene, ethylene, propylene, methylethylene, butylene, 1-methylpropylene, 2-methylpropylene, 1,2-dimethylpropylene, 1,3-dimethylpropylene, 1-methylbutylene, 2-methylbutylene, 3-methylbutylene, 4-methylbutylene, 2,4-dimethylbutylene, 1,3-dimethylbutylene, pentylene, hexylene, heptylene, octylene, ethane-1,1-diyl, propane-2,2-diyl and the like. As the group given by replacing the methylene group in the foregoing alkylene group by —O—, —S—, —CO—, —COO—, —OCO—, —SO$_2$—, —NH—, —CONH—, —NHCO—, —N═CH—, or —CH═CH—, there may be mentioned methyleneoxy, ethyleneoxy, oxymethylene, thiomethylene, carbonylmethylene, carbonyloxymethylene, methylenecarbonyloxy, sulfonylmethylene, aminomethylene, acetylamino, ethylenecarboxyamide, ethaneimidoyl, ethenylene, propenylene and the like.

The halogen atom represented by $R^6$ to $R^9$ in the formula (V) may include fluorine, chlorine, bromine, and iodine. As the alkyl group represented by $R^6$ to $R^9$ which has 1 to 4 carbon atoms and is optionally substituted by a halogen atom, there may be mentioned methyl, ethyl, propyl, isopropyl, butyl, sec-butyl, tert-butyl, isobutyl, chloromethyl, dichloromethyl, trichloromethyl, bormomethyl, dibromomethyl, tribromomethyl, fluoromethyl, difluoromethyl, trifluoromethyl, 2,2,2-trifluoroethyl, perfluoroethyl, perfluoropropyl, perfluorobutyl and the like. As the alkoxy group represented by $R^6$ to $R^9$ which has 1 to 4 carbon atoms and is optionally substituted by a halogen atom, there may be mentioned methoxy, ethoxy, propoxy, isopropoxy, butoxy, sec-butoxy, tert-butoxy, trifluoromethyloxy and the like. As the ring structure formed by linking $R^5$ and $R^6$ together, there may be mentioned rings such as benzene, naphthalene, anthracene, cyclobutene, cyclopentene, cyclohexene, cyclopentadiene, pyrrole, furan, thiophene, dihydropyrrole, pyridine, pyran, isoxazole, pyrazine, pyrimidine, pyridazine, pyrazole, isothiazole, imidazole, quinoline, and carbazole. These rings may be substituted by a halogen atom, an alkyl group, an alkoxy group, and others.

As the anion presented by $An^{q-}$ in the general formulas (VI) and (VII), there may be mentioned, for example, a monovalent anion including a halogen anion such as chloride, bromide, iodide, and fluoride; an inorganic anion such as perchlorate, chlorate, thiocyanate, phosphorus hexafluoride, antimonium hexafluoride, boron tetrafluoride and the like; an organic sulfonate anion such as benzene sulfonate, toluene sulfonate, trifluoromethane sulfonate, diphenylamine-4-sulfonate, 2-amino-4-methyl-5-chlorobenzene sulfonate, 2-amino-5-nitrobenzene sulfonate and the like; an organic phosphate anion such as octylphosphate, dodecylphosphate, octadecylphosphate, phenylphosphate, nonylphenylphosphate, 2,2'-methylenebis(4,6-ditert-butylphenyl)phosphonate and the like; bistrifluoromethyl sulfonylimide anion; bisperfluorobutane sulfonylimide anion; perfluoro-4-ethylcyclohexane sulfonate anion; tetrakis(pentafluorophenyl)borate anion; and others; and a di-valent anion including benzene disulfonate, naphthalene disulfonate, and others. If necessary, there may be also used a quencher anion that works to de-excite (quench) an active molecule in an excited state; a metallocene compound anion such as ferrocene and ruthenocene that are composed of a cyclopentadienyl ring having an anionic group such as carboxyl, phosphonic, and sulfonic; and the like.

As the foregoing quencher anion, there may be mentioned, for example, an anion represented by the general formula (A) or (B) shown below, and an anion described in Japanese Patent Laid-Open Publication No. S60-234892, Japanese Patent Laid-Open Publication No. H05-43814, Japanese Patent Laid-Open Publication No. H05-305770, Japanese Patent Laid-Open Publication No. H06-239028, Japanese Patent Laid-Open Publication No. H09-309886, Japanese Patent Laid-Open Publication No. H09-323478, Japanese Patent Laid-Open Publication No. H10-45767, Japanese Patent Laid-Open Publication No. H11-208118, Japanese Patent Laid-Open Publication No. 2000-168237, Japanese Patent Laid-Open Publication No. 2002-201373, Japanese Patent Laid-Open Publication No. 2002-206061, Japanese Patent Laid-Open Publication No. 2005-297407, Japanese Examined Patent Application Publication No. H07-96334, International Publication No. WO98/29257, and others.

[Chemical 6]

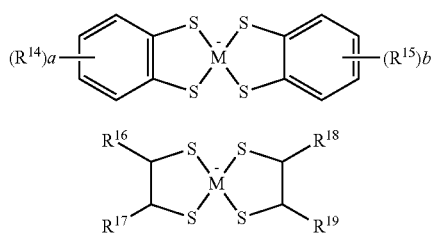

(In the formula, M is nickel or copper atom; each of $R^{14}$ and $R^{15}$ is a halogen atom, an alkyl group having 1 to 8 carbon atoms, an aryl group having 6 to 30 carbon atoms, or —$SO_2$-G group; G is an alkyl group, an aryl group optionally substituted by a halogen atom, a dialkylamino group, a diarylamino group, piperidino group, or morpholino group; each of a and b is 0 to 4; and each of $R^{16}$, $R^{17}$, $R^{18}$ and $R^{19}$ is independently an alkyl group, an alkylphenyl group, an alkoxyphenyl group, or a halogenated phenyl group.)

There is no particular limitation on the method of incorporating $Y^1$ in the general formula (I), $Y^2$ in the general formula (II), $Y'$ in $X^1$ in the general formula (II) and $X^2$ in the general formulas (VI) and (VII), $Y^3$ in the general formula (III), and $Y^4$ and $Y^5$ in the general formulas (VI) and (VII). For example, $Y^1$ may be incorporated by reacting the NH group of a 3H-indole derivative with a halogenated organic compound such as a Hal-$Y^1$ (Hal: fluorine, chlorine, bromine or iodine). $Y^2$ to $Y^5$ and $Y'$ can be incorporated in accordance with the method for incorporating $Y^1$. Each of $Y^1$, $Y^2$, $Y'$, $Y^3$, $Y^4$ and $Y^5$ has the number of carbons of preferably 20 or less, and more preferably 10 or less, because these groups of $Y^1$, $Y^2$, $Y'$, $Y^3$, $Y^4$ and $Y^5$ become to have a larger molecular weight with an increasing number of carbon atoms and the molar absorption coefficient of the cyanine compounds of the present invention having these groups and being represented by the general formula (I), (VI) or (VII) possibly sometimes becomes lowered.

Among the cyanine compounds of the present invention represented by the general formula (I), when B in the general formula (I) is a group represented by the general formula (II), a preferred cyanine compound from the viewpoint of cost and lightfastness is characterized in that ring-$A^1$ in the general formula (I) is an optionally substituted benzene ring; $R^{21}$ and $R^{22}$ in the general formula (II) are linked together to form an optionally substituted benzene ring; or $X^1$ in the general formula (II) is —$CR^3R^4$—. Accordingly, in the case where B in the general formula (I) is a group represented by the general formula (II), a cyanine compound represented by the general formula (1) may be mentioned as a typical example of particularly preferred compounds.

[Chemical 7]

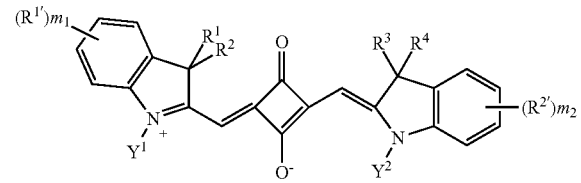

(1)

(In the formula, $R^1$, $R^2$, $R^3$, $R^4$, $Y^1$ and $Y^2$ are the same as in the general formulas (I) and (II); each of $R^{1'}$ and $R^{2'}$ is independently a halogen atom, a nitro group, a cyano group, an alkyl group having 1 to 8 carbon atoms, a halogen substituted derivative of the alkyl group, an alkoxy group having 1 to 8 carbon atoms, a halogen substituted derivative of the alkoxy group, an alkylthio group having 1 to 8 carbon atoms, or an aryl group having 6 to 30 carbon atoms; and each of $m_1$ and $m_2$ is independently an integer of 0 to 4.)

Among the cyanine compounds of the present invention, when B in the general formula (I) is a group represented by the general formula (III), a preferred cyanine compound from the viewpoint of cost and lightfastness is characterized in that ring-$A^1$ in the general formula (I) is an optionally substituted benzene ring; or $R^{21}$ and $R^{22}$ in the general formula (III) are linked together to form an optionally substituted benzene ring. Accordingly, in the case where B in the general formula (I) is a group represented by the general formula (III), a cyanine compound represented by the general formula (2) may be mentioned as a typical example of particularly preferred compounds.

[Chemical 8]

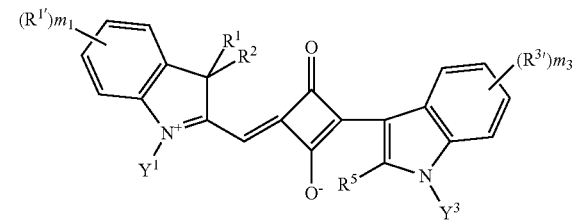

(2)

(In the formula, $R^1$, $R^2$, $R^5$, $Y^1$ and $Y^3$ are the same as in the general formulas (I) and (III); $R^{1'}$ and $m_1$ are the same as in the general formula (I); $R^{3'}$ is the same as $R^{1'}$ in the general formula (1); and $m_3$ is an integer of 0 to 4.)

Among the cyanine compounds of the present invention represented by the general formula (VII), a preferred cyanine compound from the viewpoint of cost and lightfastness is characterized in that, in the general formula (VII), ring-$A^2$ is an optionally substituted benzene ring; $R^{23}$ and $R^{24}$ are linked together to form an optionally substituted benzene ring; or $X^2$ is —CR³R⁴—. Accordingly, a cyanine compound represented by the general formula (3) may be mentioned as a typical example of particularly preferred compounds among the cyanine compounds represented by the general formula (VII).

[Chemical 9]

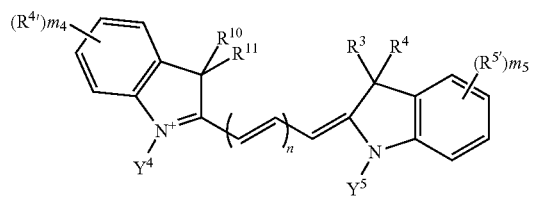

(3)

(In the formula, $R^{10}$, $R^{11}$, $R^3$, $R^4$, $Y^4$, $Y^5$ and n are the same as in the general formulas (II), (VI) and (VII); each of $R^{4'}$ and $R^{5'}$ is independently the same as $R^{1'}$ in the general formula (1); each of $m_4$ and $m_5$ is independently an integer of 0 to 4.)

The substituent represented by the general formula (IV) that is incorporated in the cyanine compound of the present invention represented by the general formula (I), (VI) or (VII) is preferably the one given by selecting an optionally substituted alkylene group having 1 to 8 carbon atoms as Z in the general formula (IV); or the one given by selecting Fe as M in the general formula (IV). Therefore, among the substituents represented by the general formula (IV), particularly preferable is a substituent represented by the general formula (4).

[Chemical 10]

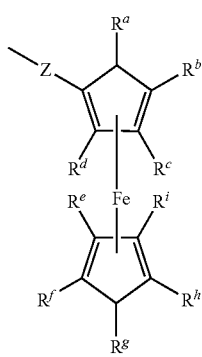

(4)

(In the formula, $R^a$ to $R^i$ are the same as in the general formula (IV); and Z is an optionally substituted alkylene group having 1 to 8 carbon atoms.)

As the specific examples of the cyanine compounds of the present invention represented by the general formula (I), (VI) or (VII), there may be mentioned the following compounds No. 1 to 30.

[Chemical 11]

Compound No. 1

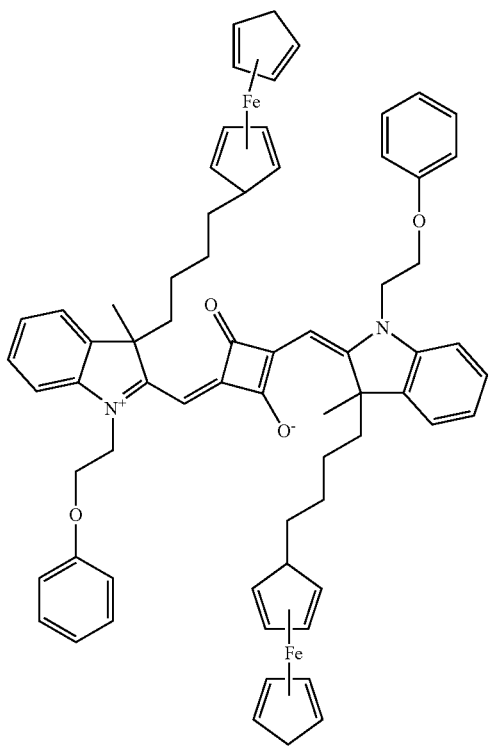

Compound No. 2

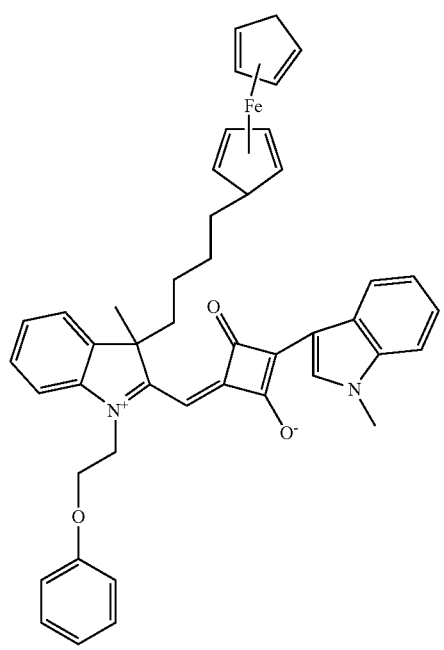

Compound No. 3
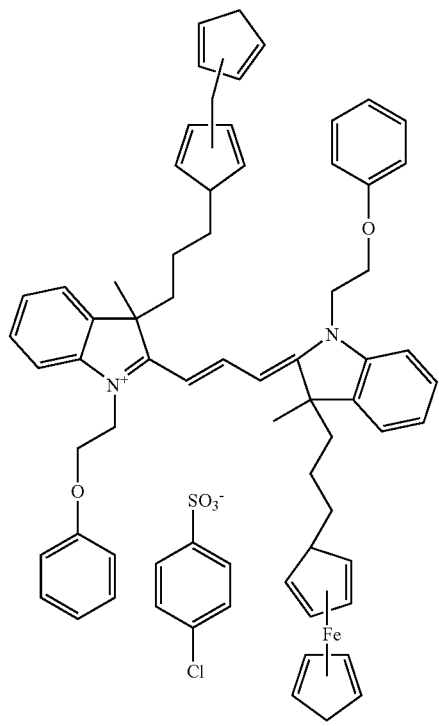
Compound No. 4
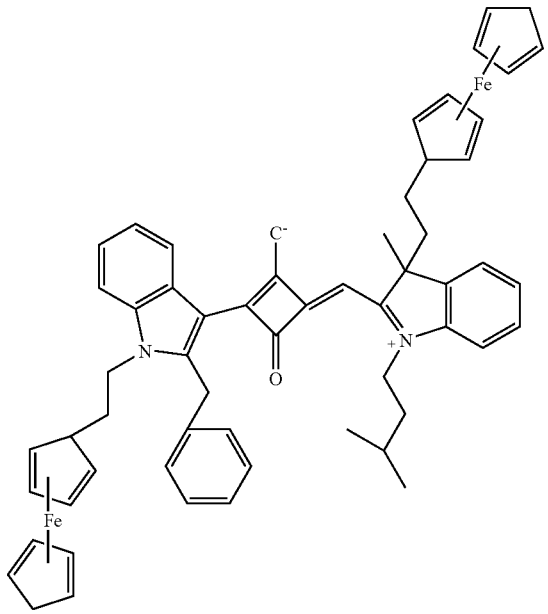
Compound No. 5
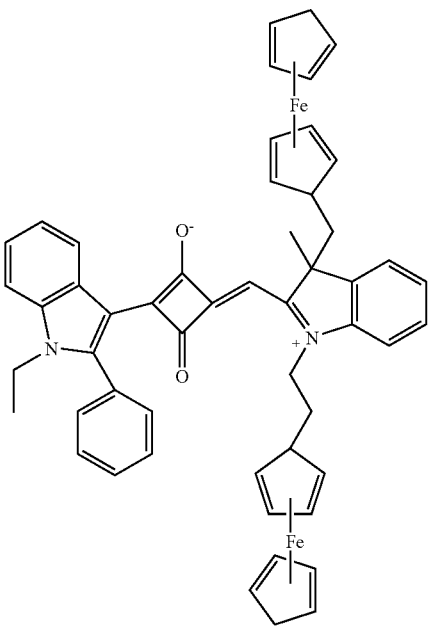
Compound No. 6
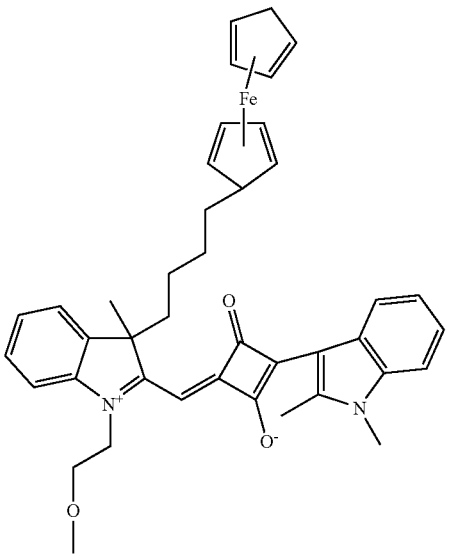

Compound No. 7
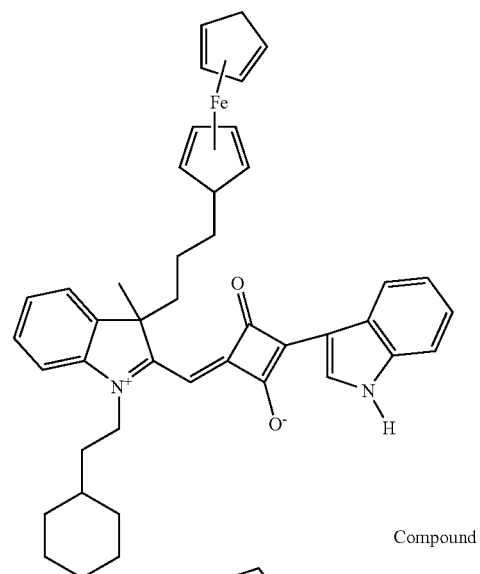
Compound No. 8
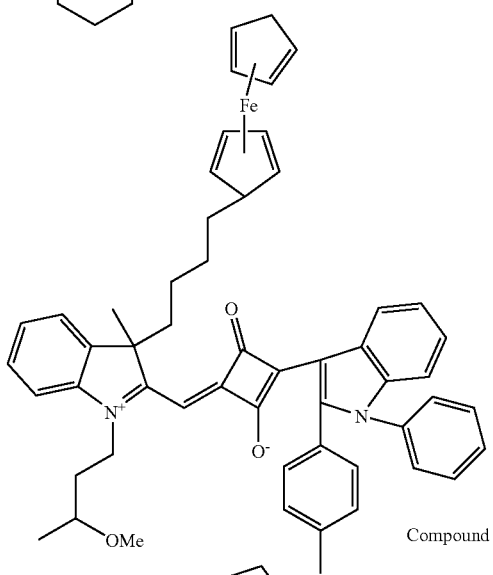
Compound No. 9
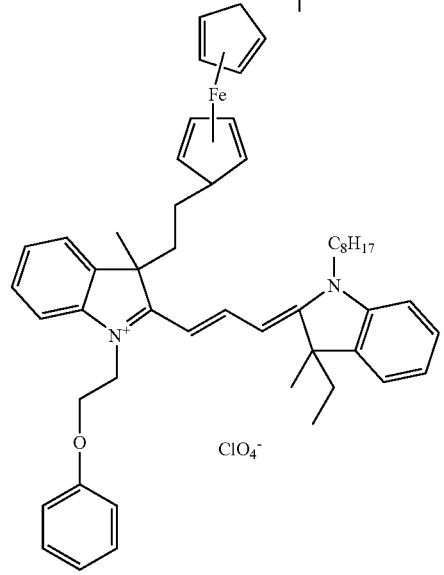
[Chemical 12]
Compound No. 10
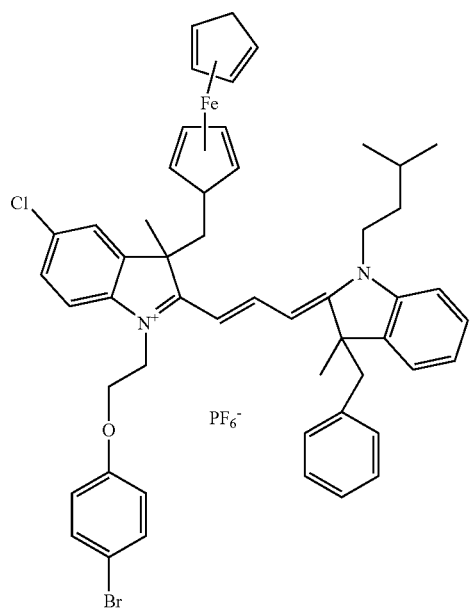
Compound No. 11
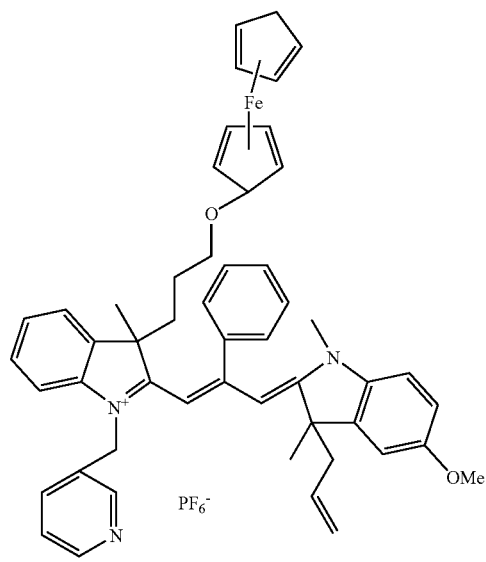

Compound No. 12
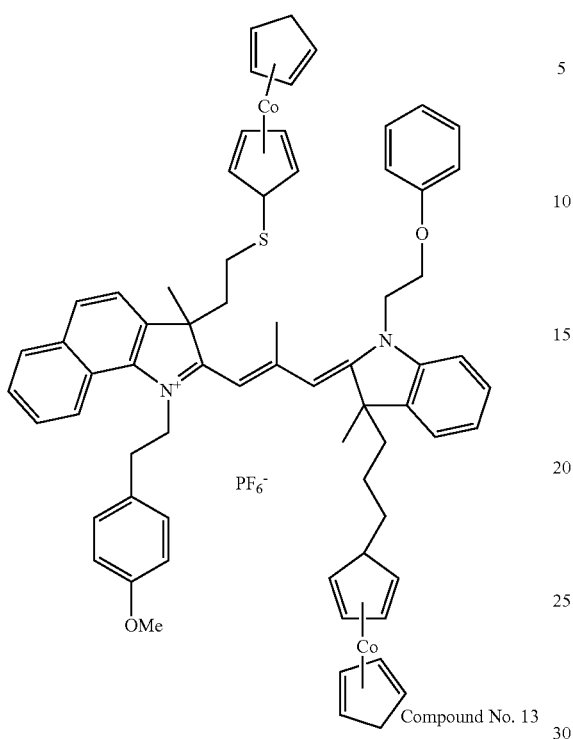
Compound No. 13
Compound No. 14
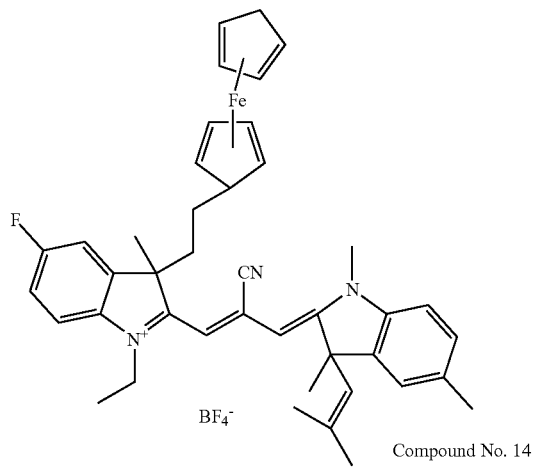
Compound No. 15
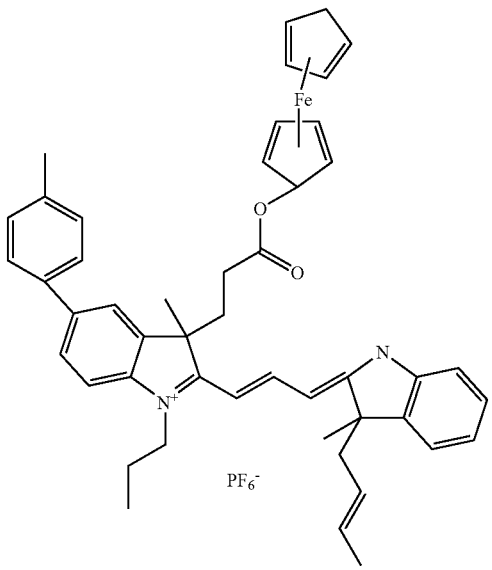
Compound No. 16
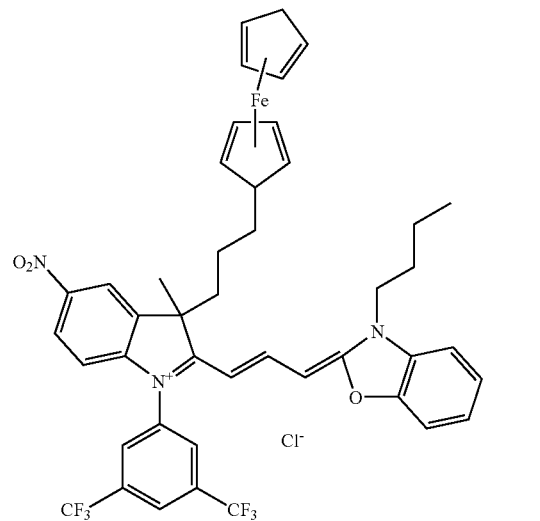
Compound No. 17
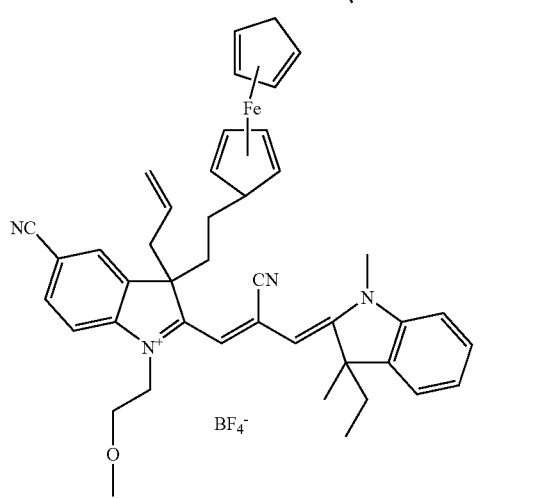
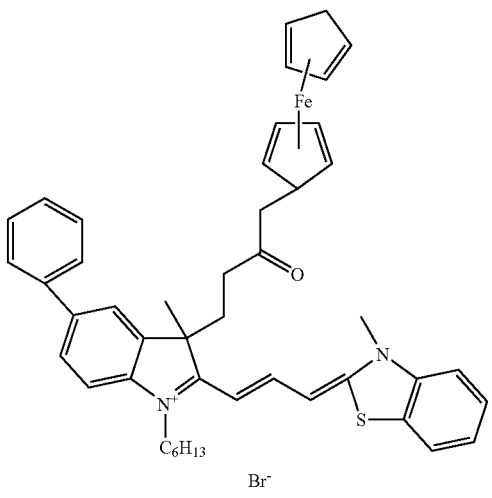

Compound No. 18
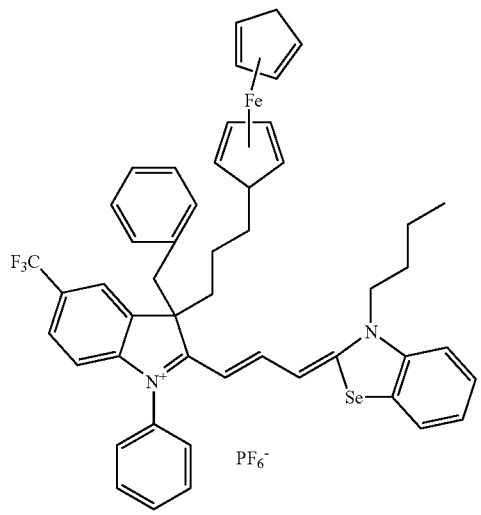
Compound No. 21
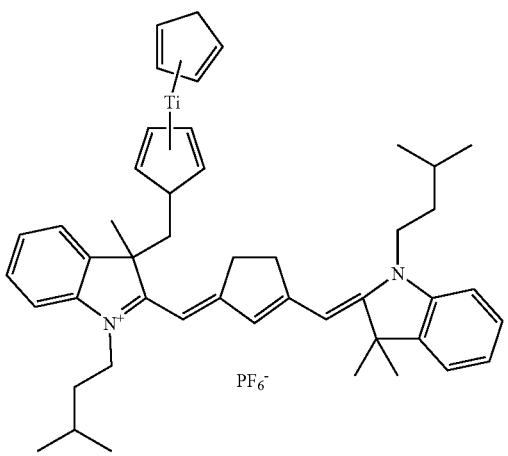
[Chemical 13]
Compound No. 19
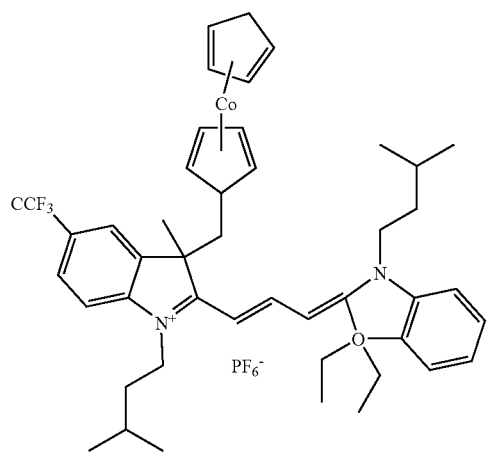
Compound No. 22
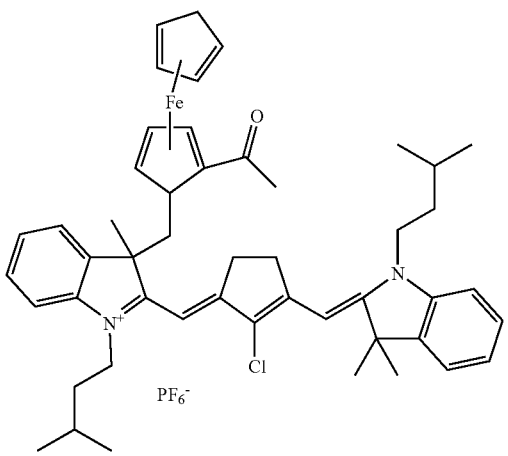
Compound No. 20
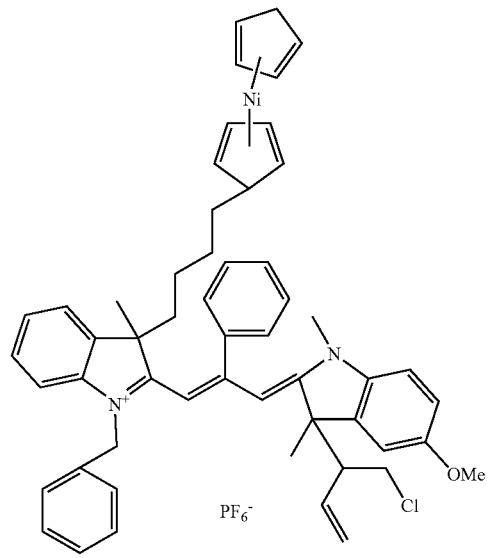
Compound No. 23
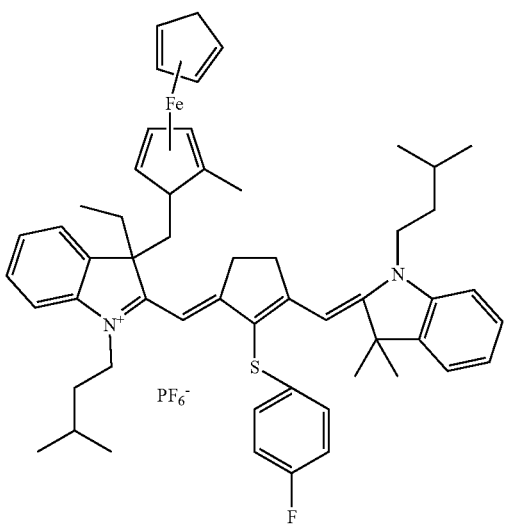

Compound No. 24
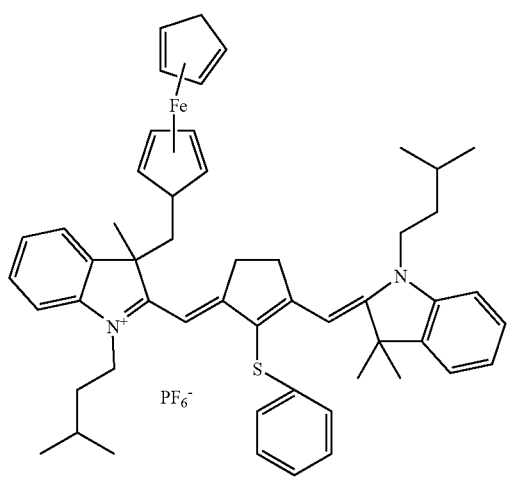
Compound No. 27
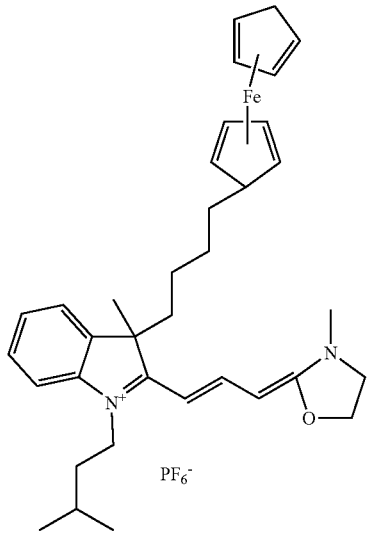
Compound No. 25
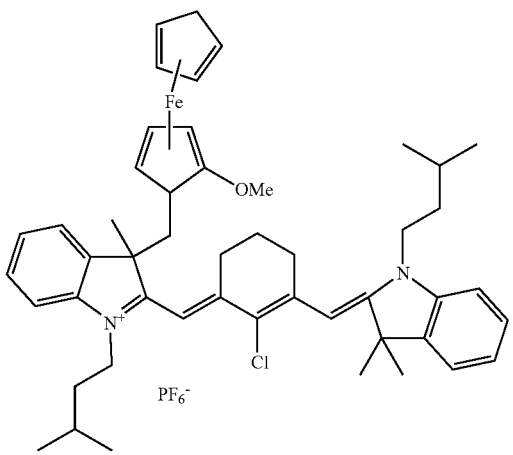
[Chemical 13A]
Compound No. 28
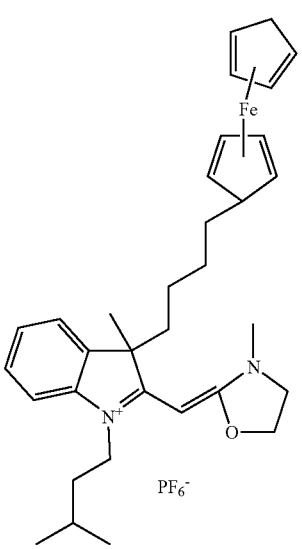
Compound No. 26
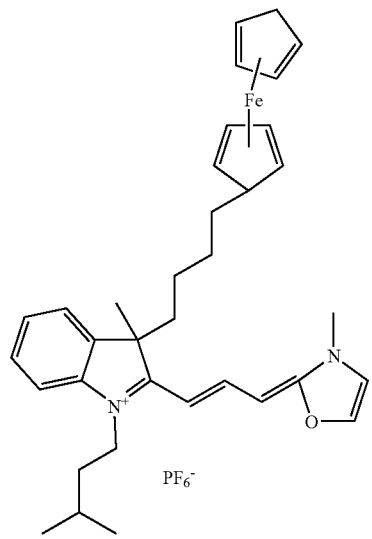
Compound No. 29
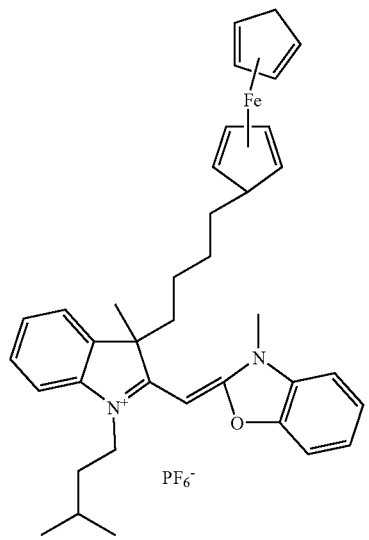

Compound No. 30

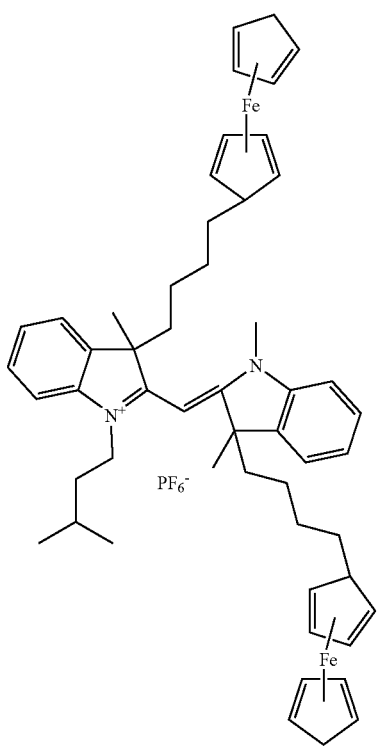

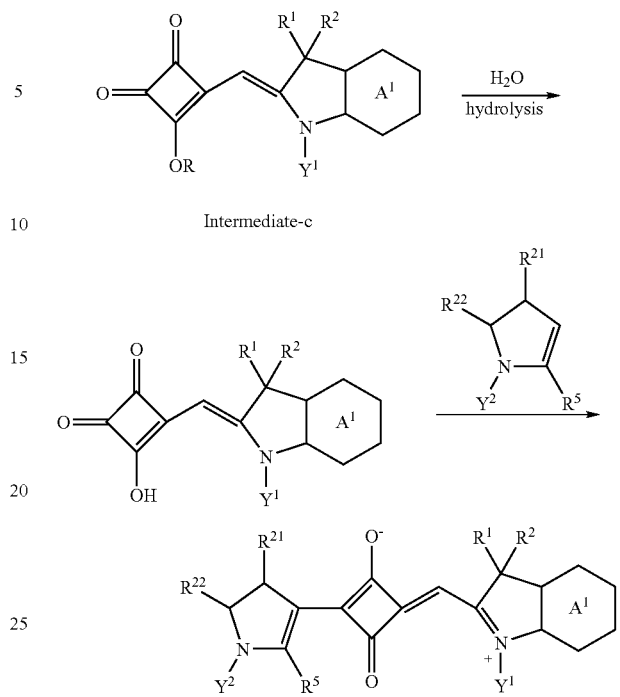

There is no particular limitation on the method for producing the cyanine compounds of the present invention represented by the general formula (I), and the compound can be obtained by any method using reactions generally known in the art. As the method for producing the compound, there may be mentioned, for example, a series of reactions as shown by the following [Chemical 14], in which the compound is synthesized through reactions of a compound providing an aimed ring structure and a squaric acid derivative. Note that, the following [Chemical 14] shows the method of producing a cyanine compound in which B in the general formula (I) is the group represented by the general formula (III), but in the case of a cyanine compound in which B is a group represented by the general formula (II), the similar method may be employed.

[Chemical 14]

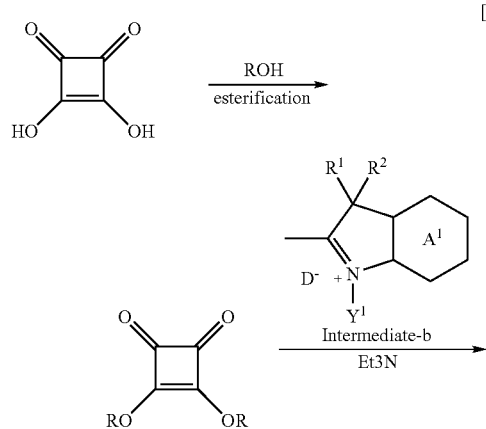

(In the formula, ring-$A^1$, $R^1$, $R^2$, $R^5$, $R^{21}$, $R^{22}$, $Y^1$ and $Y^3$ are the same as in the general formulas (I) and (III); R is an alkyl group; and $D^-$ is a halogen anion or a sulfonyloxy anion.)

In the [Chemical 14], the halogen represented by D may include chlorine, bromine and iodine, and the sulfonyloxy may include phenylsulfonyloxy, 4-methylsulfonyloxy, 4-chlorosulfonyloxy and the like.

In the [Chemical 14], the intermediate-b may be synthesized from the intermediate-a through a reaction route shown by the following [Chemical 15].

[Chemical 15]

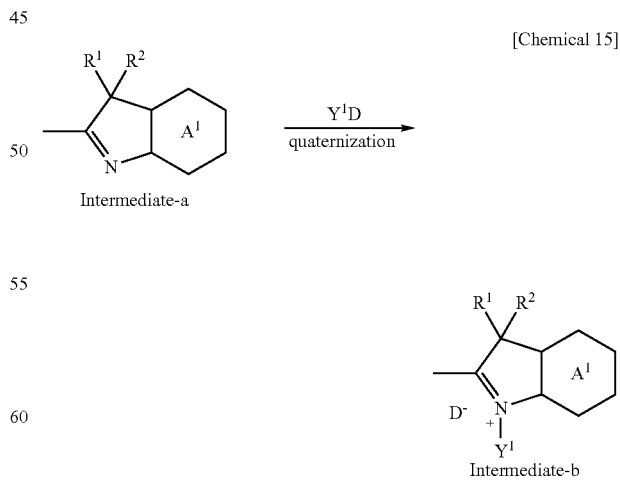

(In the formula, ring-$A^1$, $R^1$, $R^2$, $Y^1$ and $Y^2$ are the same as in the formula (I); and $D^-$ is a halogen anion or a sulfonyloxy anion.)

The intermediate-a may be represented by the general formula (VIII).

[Chemical 16]

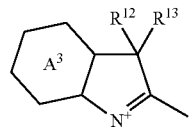
(VIII)

wherein ring-$A^3$ is the same as the ring-$A^1$ in the general formula (I); $R^{12}$ is the same as $R^1$ in the general formula (I); and $R^{13}$ is the same as $R^2$ in the general formula (I).

A specific example of the intermediate-a may include the following compounds No. 31 to 39.

[Chemical 17]

Compound No. 31

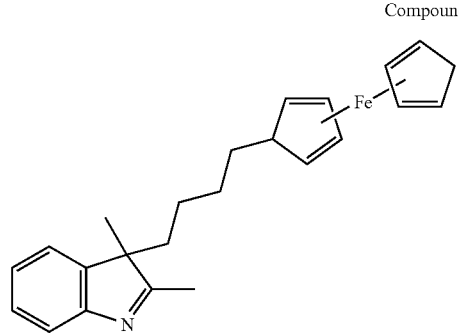

Compound No. 32

Compound No. 33

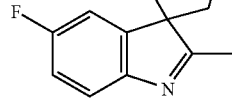

Compound No. 34

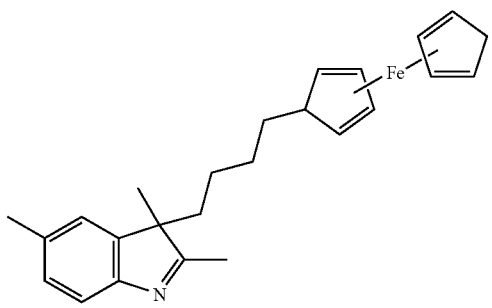

Compound No. 35

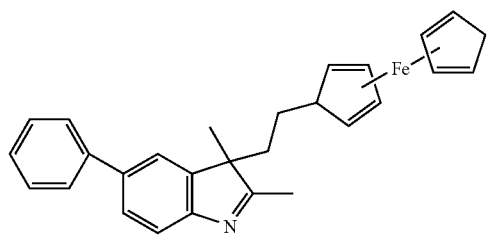

Compound No. 36

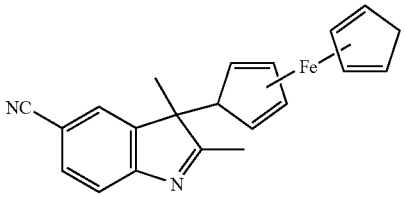

Compound No. 37

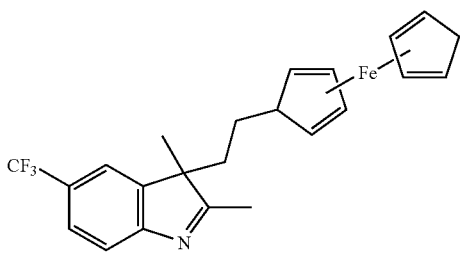

Compound No. 38

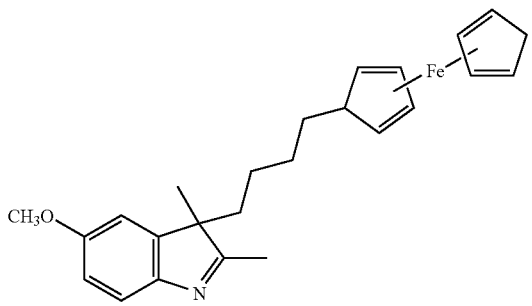

Compound No. 39

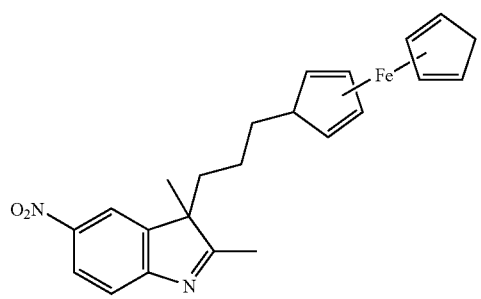

The intermediate-a may be produced, for example, as shown in the following [Chemical 18A].

[Chemical 18A]

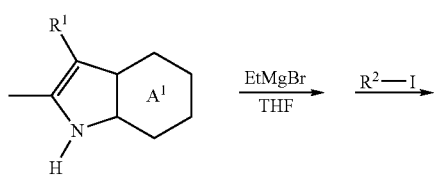

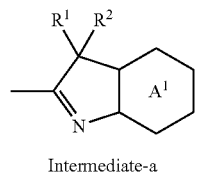

Intermediate-a

The intermediate-b in the [Chemical 15] may be represented by the general formula (IX).

[Chemical 18]

(IX)

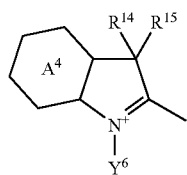

wherein ring-$A^4$ is the same as the ring-$A^1$ in the general formula (I); $Y^6$ is the same as $Y^1$ in the general formula (I); $R^{14}$ is the same as $R^1$ in the general formula (I); and $R^{15}$ is the same as $R^2$ in the general formula (I).

A specific example of the intermediate-b may include the following compounds No. 40 to 48.

[Chemical 19]

Compound No. 40

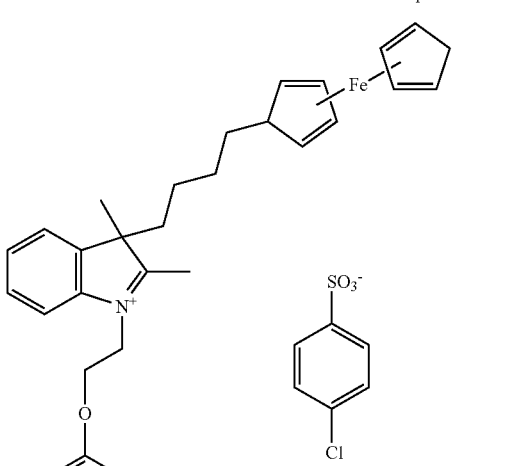

Compound No. 41

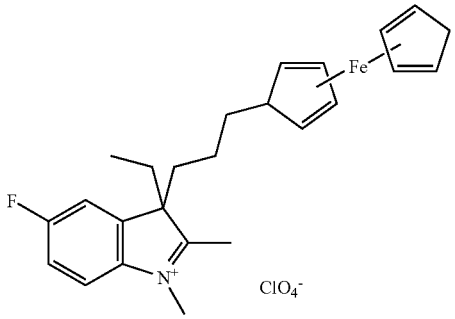

Compound No. 42

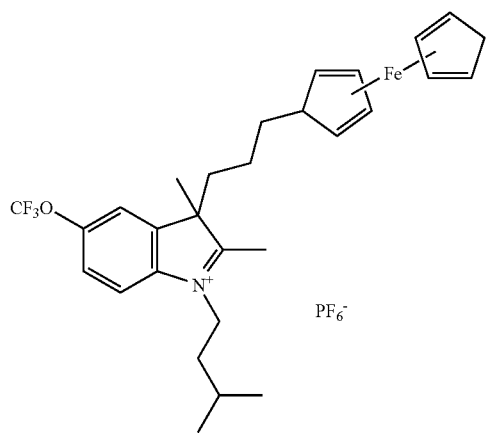

Compound No. 43

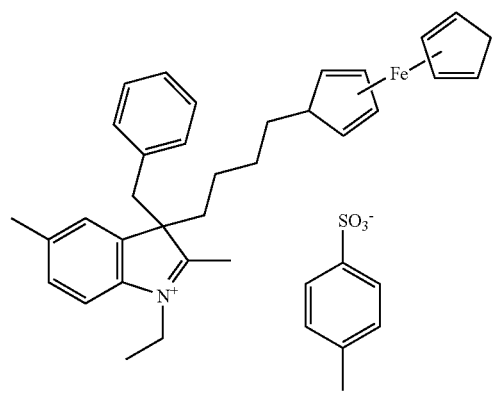

Compound No. 44

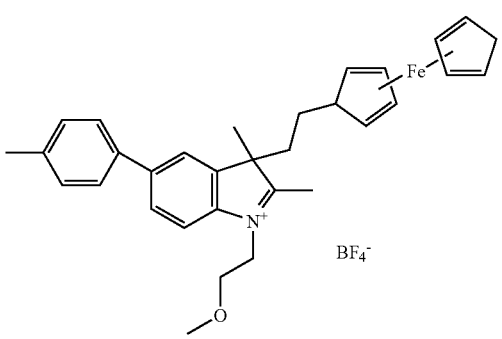

Compound No. 45

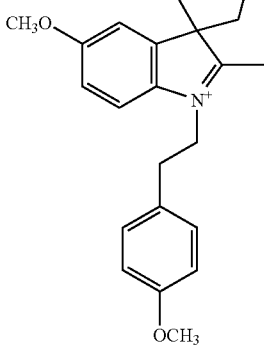

Compound No. 46

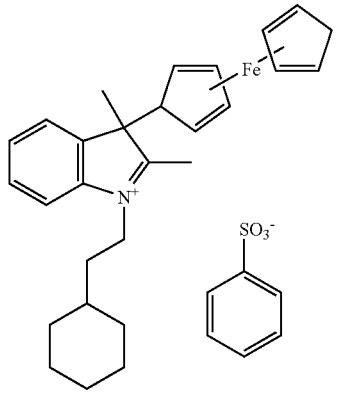

Compound No. 47

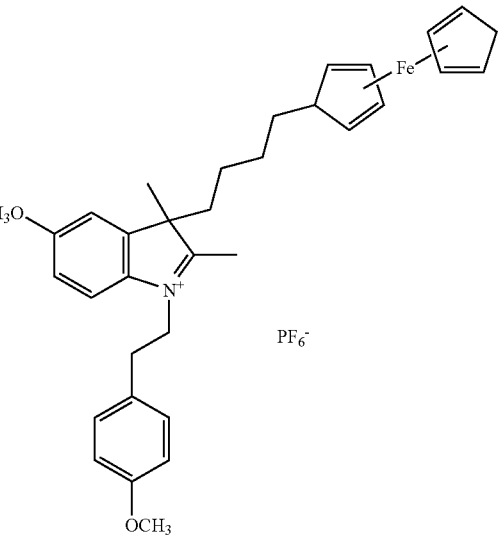

Compound No. 48

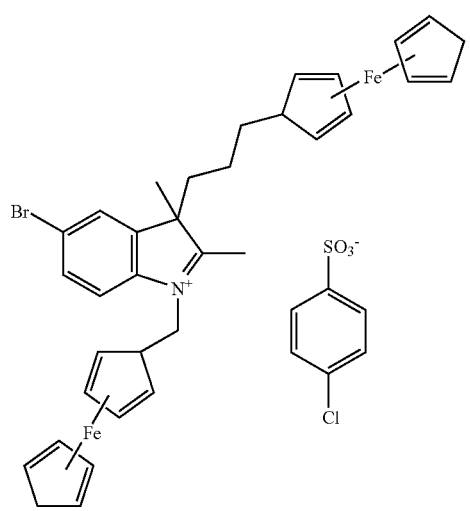

The intermediate-c in the [Chemical 14] may be represented by the general formula (X).

[Chemical 20]

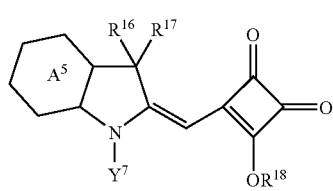
(X)

wherein ring-$A^5$ is the same as the ring-$A^1$ in the general formula (I); $Y^7$ is the same as $Y^1$ in the general formula (I); $R^{16}$ is the same as $R^1$ in the general formula (I); $R^{17}$ is the same as $R^2$ in the general formula (I); and $R^{18}$ is a hydrogen atom or an alkyl group having 1 to 8 carbon atoms.

A specific example of the intermediate-c may include the following compounds No. 49 to 57.

[Chemical 21]
Compound No. 49
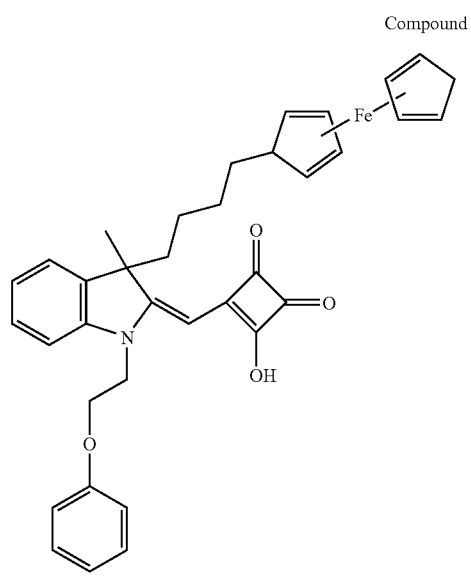
Compound No. 52
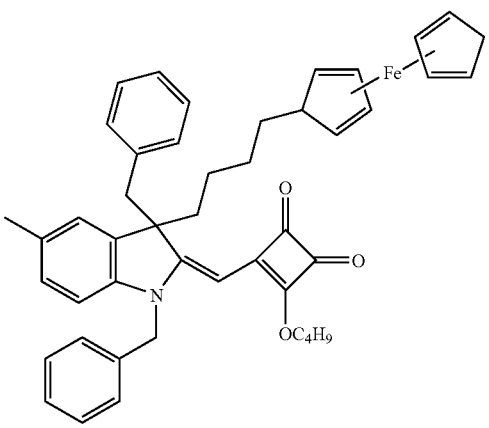
Compound No. 53
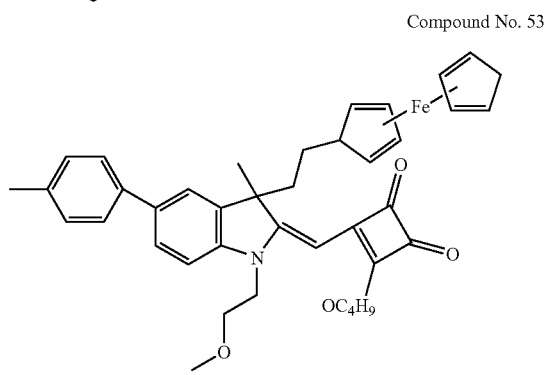
Compound No. 50
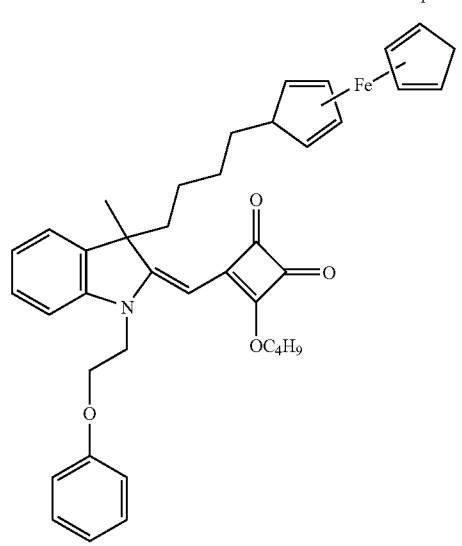
Compound No. 54
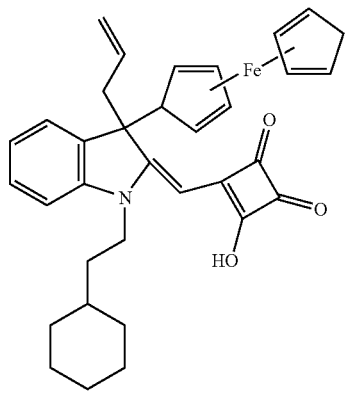
Compound No. 51
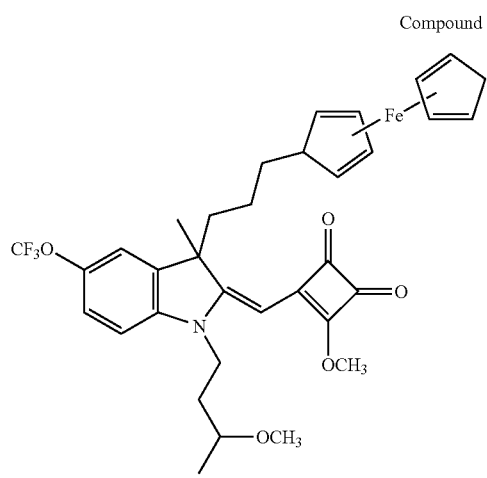
Compound No. 55
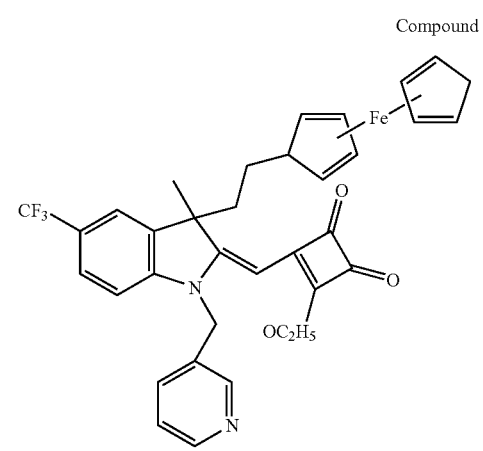

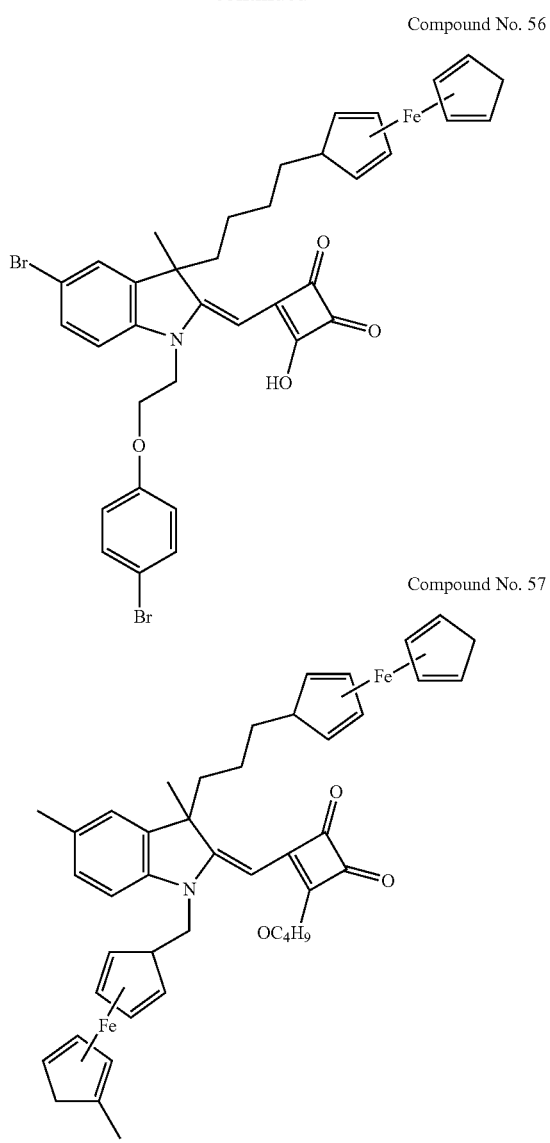

Compound No. 56

Compound No. 57

There is no particular limitation on the method for producing the cyanine compound of the present invention represented by the general formula (VI) or (VII), and the compound may be produced by the method using reactions generally known in the art. For example, there may be mentioned a method in which the compound is produced from the intermediate-b along the reaction route as shown in the [Chemical 22]. Note that, the [Chemical 22] shows the method for producing the cyanine compound represented by the general formula (VI), but the cyanine compound represented by the general formula (VII) may be produced in accordance with the same method.

[Chemical 22]

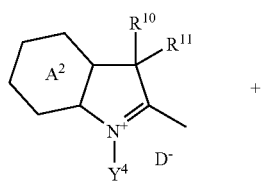

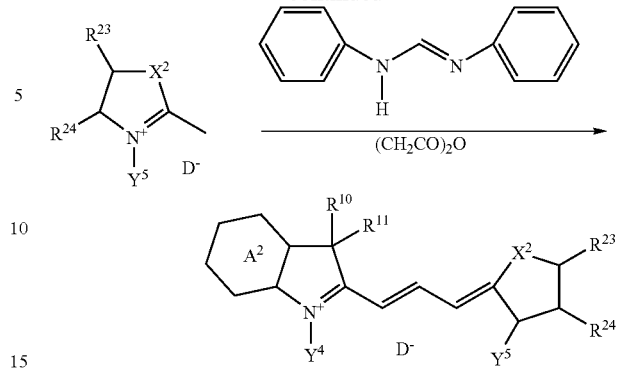

The cyanine compound of the present invention described above is suitable as an optical element that is active to the light 500 nm to 700 nm, and particularly 550 nm to 620 nm. The optical element is an element which exhibits its function by absorbing a specific light, including specifically a light absorber, an optical recording agent, a photosensitizer and the like. For example, the optical recording agent is used in an optical recording layer of optical recording media such as DVD-Rs. The light absorber is used in an optical filter for image display devices such as liquid crystal displays (LCDs), plasma display panels (PDPs), electroluminescence displays (ELDs), cathode ray tubes (CRTs), fluorescent display tubes and field emission displays; and an optical filter for analytical instruments, semiconductor device production, astronomical observation, optical communication, and others.

The cyanine compound of the present invention has not only excellent optical performance and light stability, but also has a high light absorption coefficient, so that the compounds has an advantage of reducing the added amount. In addition, a large solubility to an organic solvent is also an advantage of the compound. These characteristics are advantages in application of the compounds to optical recording media and optical filters.

For example, in the case of application to optical recording media, the optical recording layer of optical discs and others are formed generally by spin-coating or spraying a solution dissolving an optical recording agent in an organic solvent. Therefore, a compound that has a larger solubility to the organic solvent is advantageously used as the optical recording agent, because a larger process margin can be expected in the process of forming the optical recording layer. A compound that has a large solubility to an organic solvent generally has also good compatibility with a synthetic resin, so that the compound can be advantageously used for the production of optical filters as well where an optical element is required to be dispersed or dissolved uniformly in the synthetic resin.

Hereinafter, the optical filter of the present invention that contains the cyanine compound of the present invention is described.

In the optical filter of the present invention, particularly for the use in an image display device, the used amount of the cyanine compound of the present invention per area of the optical filter is generally 1 mg/m$^2$ to 1,000 mg/m$^2$, and preferably 5 mg/m$^2$ to 100 mg/m$^2$. When the amount used is less than 1 mg/m$^2$, the light absorption effect is not fully attained. When the amount used exceeds 1,000 mg/m$^2$, the color of the filter becomes strong and the display quality may become degraded, and also the brightness may become lowered.

The optical filter of the present invention is disposed in front of a display in general when it is used for an image display device. For example, the optical filter of the present invention may be directly attached to the surface of the display, or when a front panel is disposed in front of the display, the filter may be attached to the front (outside) or rear (display side) of the front panel.

In the case where the optical filter of the present invention is used for an image display device, a light absorber other than the cyanine compound of the present invention may be used in combination so as to control the color tone of the filter, or another light absorber that acts in the range of 480 nm to 500 nm other than the cyanine compound of the present invention may be used in combination so as to prevent the reflection or glare of outside light. When the image display device is a plasma display, a near-infrared absorber that acts around 750 nm to 1,100 nm may be used in combination.

As the foregoing light absorber used to control the color tone, particularly as a light absorber used to remove orange color light of 550 nm to 600 nm, there may be mentioned trimethine cyanine derivatives such as trimethine indolium compounds, trimethine benzoxazolium compounds, and trimethine benzothiazolium compounds; pentamethine cyanine derivatives such as pentamethine oxazolium compounds and pentamethine thiazolium compounds; squarylium dye derivatives; azomethine dye derivatives; xanthene dye derivatives; azo dye derivatives; pyromethene dye derivatives; azo metal complex derivatives; rhodamine dye derivatives; phthalocyanine derivatives; porphyrin derivatives; dipyromethene metal chelates; and the like.

The foregoing light absorber that acts in the range of 480 nm to 500 nm and is used to prevent the reflection and glare of outside light may include trimethine cyanine derivatives such as trimethine indolium compounds, trimethine oxazolium compounds, trimethine thiazolium compounds, and indolidene trimethine thiazolium compounds; phthalocyanine derivatives; naphthalocyanine derivatives; porphyrin derivatives; dipyromethene metal chelates; and others.

As the near-infrared absorber that acts in the range of 750 nm to 1,100 nm and is used to prevent the malfunction of an infrared remote controller, there may be mentioned bisiminium derivatives; pentamethine cyanine derivatives such as pentamethine benzoindolium compounds, pentamethine benzoxazolium compounds, and pentamethine benzothiazolium compounds; heptamethine cyanine derivatives such as heptamethine indolium compounds, heptamethine benzoindolium compounds, heptamethine oxazolium compounds, heptamethine benzoxazolium compounds, heptamethine thiazolium compounds, and heptamethine benzothiazolium compounds; squarylium derivatives; nickel complexes such as bis(stilbene dithiolato) nickel compounds, bis(benzene dithiolato) nickel compounds, and bis(camphor dithiolato) nickel compounds; azo dye derivatives; phthalocyanine derivatives; porphyrin derivatives; dipyromethene metal chelates; and the like.

In the optical filter of the present invention, the light absorber that controls the color tone, the light absorber that acts in the range of 480 nm to 500 nm, and the near-infrared absorber may be incorporated in the same layer as the cyanine compound of the present invention, or may be in a different layer. The used amount of them per area of the optical filter is in the range of generally 1 mg/m$^2$ to 1,000 mg/m$^2$, and preferably 5 mg/m$^2$ to 100 mg/m$^2$.

As a typical configuration of the optical filter according to the present invention, there may be mentioned a configuration which is composed of a transparent support and optionally one or more layers such as an undercoating layer, an anti-reflection layer, a hard coat layer, and a lubricating layer that are formed on the transparent support. As the method for incorporating into the optical filter of the present invention the cyanine compound of the present invention, the light absorbers that are dye compounds other than the cyanine compound of the present invention, and the arbitrary components such as various kinds of stabilizers, there may be mentioned, for example, (1) a method in which they are incorporated into the transparent support or either of the arbitrary layers; (2) a method in which they are coated on the transparent support or either of the arbitrary layers; (3) a method in which they are incorporated into an adhesive layer between two adjacent members arbitrarily selected from the transparent support and either of the arbitrary layers; and (4) a method in which a light absorption layer that contains a light absorber including the cyanine compound of the present invention is provided besides the arbitrary layers. The cyanine compound according to the present invention is suitably incorporated into the adhesive layer as described above in the method (3), or incorporated into the light absorption layer as described above in the method (4).

As the material for the aforementioned transparent support, there may be mentioned, for example, an inorganic material including glass and a polymer material including cellulose ester such as diacetylcellulose, triacetylcellulose (TAC), propionylcellulose, butyrylcellulose, acetylpropionylcellulose, and nitrocellulose; polyamide; polycarbonate; polyester such as polyethylene terephthalate, polyethylene naphthalate, polybutylene terephthalate, poly-1,4-cyclohexane dimethylene terephthalate, polyethylene-1,2-diphenoxyethane-4,4'-dicarboxylate, and polystyrene; polyolefin such as polyethylene, polypropylene, and polymethylpentene; acrylic resin such as polymethylmethacrylate; polycarbonate; polysulfone; polyethersulfone; polyetherketone; polyetherimide; polyoxyethylene; and norbornene resin. The transparent support has a transparency of preferably 80% or more and more preferably 86% or more, a haze of preferably 2% or less and more preferably 1% or less, and a refraction index of preferably 1.45 to 1.70.

The transparent support may contain an infrared absorber, a UV absorber, a phenol- or phosphorus-based anti-oxidant, a flame retardant, a lubricant, an anti-static agent, inorganic fine particles and others. The transparent support may have various kinds of surface treatments.

The inorganic fine particles may include, for example, silicon dioxide, titanium dioxide, barium sulfate, calcium carbonate, talc, and kaolin.

The surface treatment may include, for example, chemical treatment, mechanical treatment, corona discharge, flare treatment, UV irradiation, high-frequency treatment, glow discharge treatment, plasma cleaning, laser treatment, mixed acid treatment, and ozone oxidation.

The aforementioned undercoating layer is interposed between the transparent support and the light absorbing layer, when the light-absorbing layer that contains a light absorber is provided in the optical filter. The undercoating layer is a layer that contains a polymer having a glass transition temperature of from −60 to 60° C., a layer that has a roughened surface facing the side of the light-absorbing layer, or a layer that contains a polymer having an affinity to the polymer contained in the light-absorbing layer. The undercoating layer may be formed on the transparent support on the side where the light absorbing layer is not formed so as to improve the adhesion between the transparent support and the layer (for example, anti-reflection layer or hard coat layer) to be provided on the transparent support, or may be formed so as to improve the affinity between the optical filter and an adhesive with which the optical filter is fixed on an image display device. The undercoating layer may has a thickness of preferably 2 nm to 20 µm, more preferably 5 nm to 5 µm, still more preferably 20 nm to 2 µm, further more preferably 50 nm to 1 µm, and particularly preferably 80 nm to 300 nm. The undercoating layer that contains the polymer having a glass transition temperature of from −60 to 60° C. bonds the transparent support and the filter layer together with the help of the adhesion of the polymer. The polymer having a glass transition temperature of from −60 to 60° C. may be obtained, for example, by polymerization of vinyl chloride, vinylidene chloride, vinyl acetate, butadiene, neoprene, styrene, chloroprene, acrylate, methacrylate, acrylonitrile, and methylvinylether, or copolymerization thereof. The glass transition temperature is preferably 50° C. or lower, more preferably 40° C. or lower, still more preferably 30° C. or lower, further more preferably 25° C. or lower, and particularly preferably 20° C. or lower. The undercoating layer may have an elasticity of preferably 1 to 1,000 MPa, more preferably 5 to 800 MPa, and particularly preferably 10 to 500 MPa at 25° C. The undercoating layer that has a roughened surface on the side facing the light absorbing layer works to bond the transparent support and the light absorbing layer together by forming the light absorbing layer on the roughened surface. The undercoating layer that has a roughened surface on the side facing the light absorbing layer may be formed easily by coating a polymer latex. The latex may have an average diameter of preferably 0.02 to 3 µm and more preferably 0.05 to 1 µm. The polymer that has an affinity to the binder polymer of the light absorbing layer may include acrylic resin, cellulose derivatives, gelatin, casein, starch, polyvinylalcohol, soluble nylon, polymer latex and the like. Further, the optical filter according to the present invention may have two or more undercoating layers. The undercoating layers may contain a solvent that swells the transparent support, a matting agent, a surfactant, an anti-static agent, a coating auxiliary, a film harder, and others.

A low refraction index layer is essential in the anti-reflection layer described above. The low refraction index layer has a refraction index lower than the transparent support. The low refraction index layer has a refraction index of preferably 1.20 to 1.55 and more preferably 1.30 to 1.50. The low refraction index layer has a thickness of preferably 50 to 400 nm and more preferably 50 to 200 nm. The low refraction index layer is a layer made of a fluorine-containing polymer with a low refraction index (as described in Japanese Patent Laid-Open Publication No. S57-34526, Japanese Patent Laid-Open Publication No. H03-130103, Japanese Patent Laid-Open Publication No. H06-115023, Japanese Patent Laid-Open Publication No. H08-313702, and Japanese Patent Laid-Open Publication No. H07-168004), a layer formed by sol-gel method (as described in Japanese Patent Laid-Open Publication No. H05-208811, Japanese Patent Laid-Open Publication No. H06-299091, and Japanese Patent Laid-Open Publication No. H07-168003), or a layer that contains fine particles (as described in Japanese Examined Patent Application Publication No. S60-59250, Japanese Patent Laid-Open Publication No. H05-13021, Japanese Patent Laid-Open Publication No. H06-56478, Japanese Patent Laid-Open Publication No. H07-92306, and Japanese Patent Laid-Open Publication No. H09-288201). The layer containing fine particles may provide the low refraction index layer with micro-voids by forming intra-particle or inter-particle voids. The layer containing fine particles has a porosity of preferably 3 to 50% by volume and more preferably 5 to 35% by volume.

It is desirable that, in the anti-reflection layer, the low refraction index layer be laminated with a layer (medium or high refraction index layer) having a high refraction index so as to prevent reflection in a wider range of wavelength. The high refraction index layer has a refraction index of preferably 1.65 to 2.40 and more preferably 1.70 to 2.20. The medium refraction index layer is regulated to have a medium refraction index between the refraction indexes of the low and high refraction index layers. The medium refraction index layer has a refraction index of preferably 1.50 to 1.90 and more preferably 1.55 to 1.70. The medium and high refraction index layers have a thickness of preferably 5 nm to 100 µm, more preferably 10 nm to 10 µm, and particularly preferably 30 nm to 1 µm. The medium and high refraction index layers have a haze of preferably 5% or less, more preferably 3% or less, and particularly preferably 1% or less. The medium and high refraction index layers may be formed by using a polymer binder having a relatively high refraction index. The polymer having high refraction indexes may include polystyrene, styrene copolymers, polycarbonate, melamine resin, phenol resin, epoxy resin, polyurethane obtained by reacting cyclic (alicyclic or aromatic) isocyanates with polyols, and the like. Other polymers having cyclic (aromatic, heterocyclic, and alicyclic) groups and the polymers substituted by halogen atoms except fluorine also have a high refraction index. Further, there may be used a polymer obtained by a polymerization of monomers having a double bond(s) which is capable of radical curing.

In order to attain still higher refraction index, inorganic fine particles may be dispersed in the polymer binder described above. It is desirable that the inorganic fine particles have a refractive index of 1.80 to 2.80. The inorganic fine particles are desirably formed from a metal oxide or sulfide. The metal oxide or sulfide may include titanium oxide (for example, rutile, mixed crystal of rutile and anatase, anatase, and amorphous), tin oxide, indium oxide, zinc oxide, zirconium oxide, zinc sulfide and the like. Among these, titanium oxide, tin oxide, and indium oxide are particularly preferable. The inorganic fine particles contain these metal oxide or sulfide as a main component and further may contain other elements. The main component means a component that has the largest content (wt %) among the components of the particles. As the other elements, there may be mentioned Ti, Zr, Sn, Sb, Cu, Fe, Mn, Pb, Cd, As, Cr, Hg, Zn, Al, Mg, Si, P, S and others. The medium and high refraction index layers may be formed also from an inorganic material that is film-formable and solvent-dispersible, or is liquid by itself, including for example, alkoxides of various elements, organic acid salts, coordination compounds (for example, chelates) bonded with compounds having coordinative ability, and active inorganic polymers.

Antiglare function (a function of scattering incident light on the surface so as to prevent reflections of the surrounding images thereon) may be imparted to the surface of the anti-reflection layer. An anti-reflection layer having antiglare function may be obtained, for example, by providing fine bumps and dips on the surface of a transparent film and forming an anti-reflection layer thereon, or by forming bumps and dips on the surface of the anti-reflection layer with an embossing roll after the anti-reflection layer is formed. The ant-reflection layer having antiglare function has a haze of generally from 3% to 30%.

The hard coat layer described above has a higher hardness than the transparent support. The hard coat layer preferably contains a cross-linked polymer. The hard coat layer may be formed from a polymer, oligomer, or monomer of acrylic, urethane, or epoxy (for example, UV-curing resins) and the like. The hard coat layer may be formed also from a silica-based material.

A lubricating layer may be applied on the surface of the anti-reflection layer (low refractive index layer). The lubricating layer works to provide the low refractive index layer surface with sliding properties and to improve the scratch resistance of the surface. The lubricating layer may be formed from polyorganosiloxane (for example, silicone oil), natural wax, petroleum wax, higher fatty acid metal salts, and fluoro-lubricant or its derivatives. The lubricating layer has a thickness of preferably from 2 to 20 nm.

In the case of employing the aforementioned "(3) a method in which they are incorporated into an adhesive layer between two adjacent members arbitrarily selected from the transparent support and either of the layers" on incorporating the cyanine compound of the present invention into the optical filter, the cyanine compound of the present invention may be mixed into an adhesive, and then the two adjacent members from the transparent support and either of the layers may be bonded together with the adhesive. As the adhesive, there may be used a silicon-based, urethane-based or acrylic-based adhesive for resins, or a transparent adhesive for laminated glass known in the art including a polyvinylbutyral adhesive, an ethylene-vinylacetate adhesive and the like. Optionally, when the adhesives are used, as a curing agent, there may be used a cross-linking agent such as metal chelate, isocyanate, epoxy and the like. The adhesive layer has a thickness of preferably from 2 μm to 400 μm.

In the case of employing the aforementioned "(4) a method in which a light absorption layer that contains a light absorber including the cyanine compound of the present invention is provided besides the arbitrary layers", the cyanine compound of the present invention may be used as it is or after dispersed in a binder so as to form the light absorbing layer. As the binder, there may be used a natural polymer material such as gelatin, casein, starch, cellulose derivatives, alginic acid and the like, or a synthetic polymer material such as polymethylmethacrylate, polyvinylbutyral, polyvinylpyrrolidone, polyvinylalcohol, polyvinylchloride, styrene-butadiene copolymer, polystyrene, polycarbonate, polyamide and the like.

An organic solvent may be used in combination with the binder. There is no limitation on the organic solvent, and any organic solvent known in the art may be used as appropriate. The organic solvent may include, for example, alcohols such as isopropanol; etheralcohols such as methylcellosolve, ethylcellosolve, butylcellosolve, and butyldiglycol; ketones such as acetone, methylethylketone, methylisobutylketone, cyclohexanone, and diacetonealcohol; esters such as ethyl acetate, butyl acetate, and methoxyethyl acetate; acrylates such as ethyl acrylate, and butyl acrylate; fluoroalcohols such as 2,2,3,3-tetrafluoropropanol; hydrocarbons such as hexane, benzene, toluene, and xylene; and chlorinated hydrocarbons such as methylene dichloride, dichloroethane, and chloroform; and the like. These organic solvents may be used solely or two or more kinds mixed.

The aforementioned undercoating layer, anti-reflection layer, hard coat layer, lubricating layer, light absorbing layer, and other layers may be formed by coating in accordance with conventional methods. The coating method may include dip coating, air knife coating, curtain coating, roller coating, wire bar coating, gravure coating, and extrusion coating using a hopper (as described in U.S. Pat. No. 2,681,294) and the like. Two or more layers may be formed simultaneously by coating. Simultaneous coating methods are disclosed in U.S. Pat. Nos. 2,761,791, 2,941,898, 3,508,947, and 3,526,528, and in the text book of "Coating Kogagu" by Harasaki Yuji, published by Asakura Publishing Co., Ltd., in 1973, p. 253.

Hereinafter, there will be described the optical recording material of the present invention that contains the cyanine compound of the present invention and is used for an optical recording layer formed on a base of an optical recording medium. The cyanine compound of the present invention represented by the general formula (I), (VI) or (VII) is useful also for an optical recording material used for an optical recording layer of an optical recording medium that performs recording of information by being imparted a thermal information pattern with the help of laser irradiation and the like. The cyanine compound is particularly suitable for an optical recording material for use in an optical recording layer of DVD-R, DVR+R and the like. The optical recording material of the present invention is a material used to form an optical recording layer and includes the cyanine compound of the present invention represented by the general formula (I), (VI) or (VII), and a mixture of the cyanine compound of the present invention represented by the general formula (I), (VI) or (VII) and an organic solvent and/or various compounds described later.

As the method for forming the optical recording layer of the optical recording medium described above, there may be mentioned generally wet coating process, vacuum deposition, sputtering, and other methods. In the wet coating process, a solution that dissolves the cyanine compound of the present invention and various compounds in an organic solvent is coated on the base by spin-coating, spraying, dipping, or the like. Here, the organic solvent may includes lower alcohols such as methanol, and ethanol; etheralcohols such as methylcellosolve, ethylcellosolve, butylcellosolve, and butyldiglycol; ketones such as acetone, methylethylketone, methylisobutylketone, cyclohexanone, and diacetone alcohol; esters such as ethyl acetate, butyl acetate, and methoxyethyl acetate; acrylates such as ethyl acrylate, and butyl acrylate; fluoroalcohols such as 2,2,3,3-tetrafluoro propanol; hydrocarbons such as benzene, toluene, and xylene; and chlorinated hydrocarbons such as methylene dichloride, dichloroethane, and chloroform; and the like.

The optical recording layer has a thickness of generally from 0.001 to 10 μm, and preferably from 0.01 to 5 μm.

The amount of the cyanine compound of the present invention contained in the optical recording material of the present invention is preferably from 10 wt % to 100 wt % with respect to the solid content of the optical recording material of the present invention.

The optical recording material of the present invention optionally contains, besides the cyanine compound of the present invention, other compounds including a compound that is conventionally used for optical recording layers such as the other cyanine compounds, azo compounds, phthalocyanine compounds, oxonol compounds, squarylium compounds, styryl compounds, porphin compounds, azulenium compounds, croconic methine compounds, pyrylium compounds, thiopyrylium compounds, triarylmethane compounds, diphenylmethane compounds, tetrahydrocoline compounds, indophenol compounds, anthraquinone compounds, naphthoquinone compounds, xanthenes compounds, thiazine compounds, acridine compounds, oxazine compounds, spiropyran compounds, fluorene compounds, and rhodamine compounds; resins such as polyethylene, polyester, polystyrene, and polycarbonate; surfactants; anti-static agents; lubricating agents; flame retardants; radical scavengers such as hindered amines; pit-formation promoters such as ferrocene derivatives; dispersants; anti-oxidants; cross-linking agents; lightfastness additives; and the like. Further, the optical recording material of the present invention may contain aromatic nitroso compounds, aminium compounds, iminium compounds, bisiminium compounds, transition metal chelate compounds and others, as a quencher for singlet oxygen and the like. Quencher anions may be used as well. In the optical recording material of the present invention, these various kinds of compounds may be used in an amount of preferably from 0 to 50 wt % with respect to the solid content of the optical recording material according to the present invention.

A reflection film of gold, silver, aluminum, copper and the like may be formed on the above-mentioned optical recording layer by vacuum deposition or sputtering. A protective layer may be formed from acrylic resin, UV-curing resin, and others.

EXAMPLES

Hereinafter, the present invention will be further described in detail with reference to the following examples and evaluation examples, but it should be construed that the invention is in no way limited by these examples.

Example 1

Synthesis of Compound No. 31 (Intermediate-a)

In a reactor flask purged with nitrogen gas, 3.6 g (25 mmol) of 2,3-dimethylindole and 15 ml of tetrahydrofuran (THF) were charged and the resulting mixture was cooled to 0° C. After 25 ml of a THF solution dissolving 1.0 mol/L of ethylmagnesium bromide (i.e., equivalent to 25 mmol of ethylmagnesium bromide) were added dropwise over 10 minutes, the reaction solution was returned to room temperature. After stirring for 2 hours at room temperature, 9.2 g (25 mmol) of iodoferrocene butane and 10 ml of THF were added, and the reaction solution was heated and refluxed for 7 hours. The reaction solution was cooled to room temperature, 30 g of 2N hydrochloric acid was added. Thirty grams of ethyl acetate were added twice, and the resulting oil phase was separated and water-washed. The oil phase was dehydrated with anhydrous sodium sulfate. After the solvent was removed from the oil phase, the resulting residue was purified with a column (silica gel, ethyl acetate:n-hexane=1:5→1:1) to obtain 3.5 g (yield: 36%) of a brown oily product. The brown oily product was subjected to the $^1$H-NMR analysis. The brown oily product was identified as the aimed product of compound No. 31. The result of the $^1$H-NMR analysis is shown below.

Result of $^1$H-NMR Analysis (solvent: CDCl$_3$)
(Peak-top chemical shift in ppm; multiplicity; number of protons)
(0.61-0.88; m; 2), (1.33; s; 3), (1.35; m; 1), (1.76; m; 3), (2.14; t; 2), (2.24; s; 3), (3.98; m; 4), (4.03; s; 5), (7.24; m; 2), (7.30; t; 1), (7.52; d; 1)

Example 2

Synthesis of Compound No. 40 (Intermediate-b)

In a reactor flask purged with nitrogen gas, 3.4 g (8.8 mmol) of the compound No. 31 obtained in Example 1, 4.1 g (13 mmol) of phenoxyethyl-4-chlorosulfonate, and 0.92 g of dimethylacetoamide were charged, and the resulting mixture was heated at 145° C. for 5 hours. After cooled to room temperature, the reaction solution was concentrated to dryness under reduced pressure. The resulting residue was purified with a column (silica gel, chloroform:acetone=20:1→chloroform:methanol=10:1) to obtain 4.0 g of a brown oily product (yield: 65%). The brown oily product was subjected to the $^1$H-NMR analysis. The brown oily product was identified as the aimed product of compound No. 40. The result of the $^1$H-NMR analysis is shown below.

Result of $^1$H-NMR Analysis (solvent: CDCl$_3$)
(peak-top chemical shift in ppm; multiplicity; number of protons)
(0.53; m; 1), (0.70; m; 1), (1.70; m; 2), (1.55; s; 3), (1.90; t; 2), (2.03; m; 2), (2.99; s; 3), (3.98; m; 4), (4.03; s; 5), (4.48; t; 2), (5.29; t; 2), (6.87; d; 2), (6.98; t; 1), (7.24; m; 4), (7.42; d; 1), (7.50; m; 2), (7.75; d; 2), and (7.99; d; 1)

Example 3

Synthesis of Compound No. 50 (Intermediate-c)

In a reactor flask purged with nitrogen gas, 1.4 g (2.0 mmol) of the compound No. 40 obtained in Example 2, 0.50 g (2.2 mmol) of 3,4-dibutoxy-3-cyclobutene, 4.0 g of butanol, and 0.24 g of pyridine were charged, and the resulting mixture was stirred at room temperature for 15 hours, at 50° C. for 4 hours, and at 75° C. for 21 hours. The reaction solution was cooled to room temperature and concentrated to dryness under reduced pressure. The resulting residue was purified with a column (silica gel, chloroform:acetone=10:1) to obtain 0.92 g of a brown amorphous product (yield: 70%). The brown amorphous product was subjected to the $^1$H-NMR analysis. The brown amorphous product was identified as the aimed product of compound No. 50. The result of the $^1$H-NMR analysis is shown below.

Result of $^1$H-NMR Analysis (solvent: CDCl$_3$)
(0.59; m; 1), (0.77; m; 1), (0.99; m; 3), (1.39; m; 3), (1.62; s; 3), (3.84; m; 4), (3.98; s; 5), (4.69; t; 2), (4.85; t; 2), (5.61; s; 1), (6.82; dd; 2), (6.96; t; 2), (7.10; t; 1), and (7.23; m; 4)

Example 4

Synthesis of Compound No. 49 (Intermediate-c)

In a reactor flask purged with nitrogen gas, 0.90 g (1.4 mmol) of the compound No. 50 obtained in Example 3, 3.0 g of acetic acid, and 1.0 g of water were charged, and the resulting mixture was heated at 110° C. for 9 hours. After cooled to room temperature, the reaction solution was concentrated to dryness under reduced pressure. Ten gram of chloroform was added to the resulting residue twice, and an oil phase was separated and water-washed. The oil phase was dehydrated with anhydrous sodium sulfate, and then the solvent was removed from the oil phase to obtain 0.53 g (crude yield: 65%) of a brown amorphous product. The brown amorphous product was subjected to the $^1$H-NMR analysis. The brown amorphous product was identified as the aimed product of compound No. 49. The result of the $^1$H-NMR analysis is shown below.

Result of $^1$H-NMR Analysis (solvent: CDCl$_3$)
(0.59; m; 1), (0.77; m; 1), (0.99; m; 3), (1.39; m; 3), (1.62; s; 3), (1.78; t; 3), (1.85; m; 2), (1.96; m; 2), (3.84; m; 4), (3.98; s; 5), (4.25; t; 2), (4.69; t; 2), (4.85; t; 2), (5.61; s; 1), (6.82; dd; 2), (6.96; t; 2), (7.10; t; 1), and (7.23; m; 4)

Example 5

Synthesis of Compound No. 1 (Cyanine Compound Represented by the General Formula (I))

In a reactor flask purged with nitrogen gas, 0.70 g (1 mmol) of the compound No. 40 obtained in Example 2, 57 mg (0.50 mmol) of 3,4-dihydroxy-3-cyclobutene, 2.7 g of butanol, and 0.12 g of pyridine were charged, and the resulting mixture was heated at 135° C. for 3 hours. The reaction solution was cooled to room temperature and concentrated to dryness under reduced pressure. Then, the resulting residue was purified with a column (silica gel, chloroform:acetone=10:1) and recrystallized with ethanol to obtain 0.23 g (yield: 42%) of brown crystals. The resulting brown crystals were identified as the aimed product of compound No. 1. The results of analysis about the brown crystals are shown below.

Results of Analysis (1) $^1$H-NMR (solvent: CDCl$_3$)

(Peak-top chemical shift in ppm; multiplicity; number of protons)

(0.54; m; 2), (0.77; m; 2), (1.21; m; 4), (1.65; s; 6), (1.80-1.91; m; 8), (3.82; t; 8), (3.97; s; 10), (4.34; m; 8), (6.09; t; 2), (6.75; d; 4), (6.92; t; 2), and (7.15-7.36; m; 11)

(2) IR absorption (cm$^{-1}$)

2925, 1600, 1491, 1461, 1281, 1241, 1182, 1136, and 1075

(3) UV absorption (solvent: chloroform)

λmax; 642 nm, ε; 2.82×10$^5$ (4) Decomposition temperature (TG-DTA: in 100 ml/min of N$_2$ gas stream, at 10° C./min of temperature elevation rate)

287° C.; peak-top

Example 6

Synthesis of Compound No. 2 (Cyanine Compound Represented by the General Formula (I))

In a reactor flask purged with nitrogen gas, 0.53 g (0.88 mmol) of the crude product of the compound No. 50 obtained in Example 4, 0.12 g (0.88 mmol) of 1-methylindole, and 1.9 g of butanol were charged, and the resulting mixture was heated and refluxed at 110° C. for 7.5 hours. The reaction solution was cooled to room temperature and concentrated to dryness under reduced pressure. The resulting residue was purified with a column (silica gel, chloroform:acetone=10:1) to obtain 0.24 g (yield: 38%) of a copper-colored amorphous product. The resulting copper-colored amorphous product was identified as the aimed product of compound No. 2. The results of analysis about the copper-colored amorphous product are shown below.

Results of Analysis (1) $^1$H-NMR (solvent: CDCl$_3$)

(Peak-top chemical shift in ppm; multiplicity; number of protons)

(0.34; m; 1), (0.56; m; 1), (1.13; m; 2), (1.81; s; 6), (2.49; m; 1), (3.32; m; 1), (3.80; m; 2), (3.87; s; 5), (3.92; m; 4), (4.38; t; 2), (4.76; t; 2), (6.38; s; 1), (6.77; d; 2), (6.88; t; 1), (7.22; m; 5), (7.33; t; 1), (7.53; d; 2), (7.62; t; 2), (8.43; s; 1), and (8.67; d; 1)

(2) IR absorption (cm$^{-1}$)

2927, 1604, 1575, 1493, 1471, 1353, 1312, 1294, 1192, 1156, and 1088

(3) UV absorption (solvent: chloroform)

λmax; 593.5 nm, ε; 1.89×10$^5$ (4) Decomposition temperature (TG-DTA: in 100 ml/min of N$_2$ gas stream, at 10° C./min of temperature elevation rate)

264° C.; peak-top

Example 7

Synthesis of Compound No. 3 (Cyanine Compound Represented by the General Formula (I))

In a reactor flask purged with nitrogen gas, 0.68 g (1.0 mmol) of the compound No. 40 obtained in Example 2, 98 mg (0.5 mmol) of diphenylformamidine, 3.0 g of pyridine, and 0.15 g (1.5 mmol) of acetic anhydride were charged, and the resulting mixture was stirred at 40° C. for 3 hours. The reaction solution was concentrated to dryness under reduced pressure, and the resulting residue was purified with a column (silica gel, chloroform:acetone=10:1) to obtain 0.42 g (yield: 70%) of a brown amorphous product. The resulting brown amorphous product was identified as the aimed product of compound No. 3. The results of analysis about the brown amorphous product are shown below.

Results of Analysis (1) $^1$H-NMR (solvent: CDCl$_3$)

(Peak-top chemical shift in ppm; multiplicity; number of protons)

(0.55; m; 2), (0.75; m; 2), (1.21; m; 4), (1.60; s; 6), (2.02; m; 4), (3.82; s; 10), (3.95; m; 8), (4.41; m; 8), (6.70-8.02; m; 24), and (8.89; t; 1)

(2) IR absorption (cm$^{-1}$)

2963, 1599, 1557, 1489, 1460, 1428, 1346, 1261, 1171, and 1092

(3) UV absorption (solvent: chloroform)

λmax; 564.5 nm, ε; 1.11×10$^5$ (4) Decomposition temperature (TG-DTA: in 100 ml/min of N$_2$ gas stream, at 10° C./min of temperature elevation rate)

260° C.; peak-top

Evaluation Example 1

Solubility Evaluation

The solubility to ethylmethylketone at 20° C. of the compounds No. 1 to 3 obtained in Examples 5 to 7 and comparative compounds 1 to 3 among the following comparative compounds was evaluated. By adding each cyanine compound stepwise at 0.05 mass % to ethylmethylketone in the range of 0.1 mass % to 3.0 mass %, soluble or insoluble was evaluated by observation. The results are shown in Table 1.

[Chemical 23]

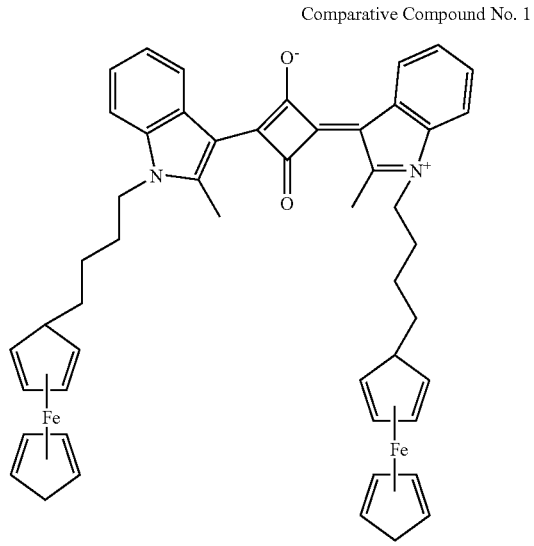

Comparative Compound No. 1

-continued

Comparative Compound No. 2

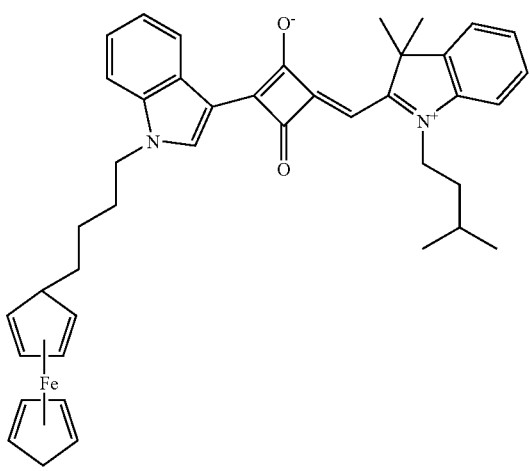

Comparative Compound No. 3

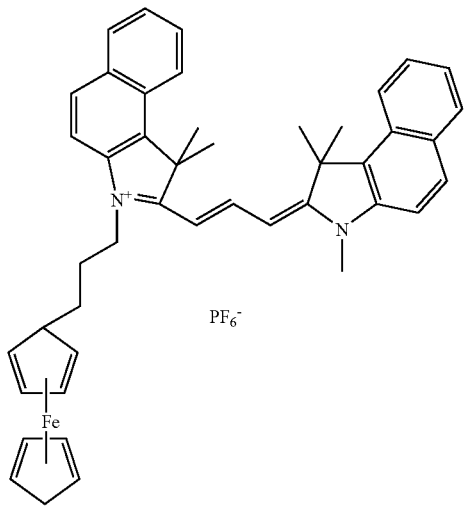

Comparative Compound No. 4

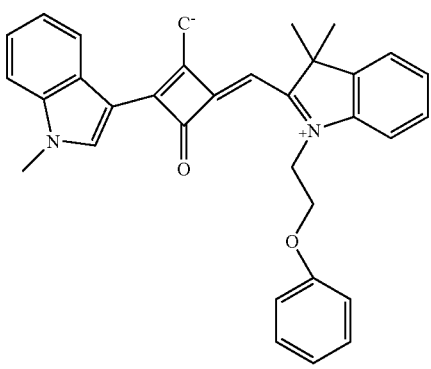

TABLE 1

| No. | Compound | Solubility |
| --- | --- | --- |
| Evaluation Example 1-1 | Compound No. 1 | 0.2 mass % soluble, 0.25 mass % insoluble |
| Evaluation Example 1-2 | Compound No. 2 | 3.0 mass % or more soluble |
| Evaluation Example 1-3 | Compound No. 3 | 3.0 mass % or more soluble |

TABLE 1-continued

| No. | Compound | Solubility |
| --- | --- | --- |
| Comparative Evaluation Example 1-1 | Comparative compound No. 1 | 0.2 mass % soluble, 0.25 mass % insoluble |
| Comparative Evaluation Example 1-2 | Comparative compound No. 2 | 0.05 mass % soluble, 0.1 mass % insoluble |
| Comparative Evaluation Example 1-3 | Comparative compound No. 3 | 2.0 mass % soluble, 2.05 mass % insoluble |

Evaluation Example 2

Lightfastness Evaluation

A solution was prepared by dissolving 1 mass % of each cyanine compound shown in Table 2 in a 1:1 (by volume) mixed solvent of ethylmethylketone and 2,2,3,3-tetrafluoro-propan-1-ol. A test specimen was prepared by spin-coating the solution at 2,000 rpm for 60 sec on a 20×20 mm polycarbonate plate.

Similarly another test specimen was prepared using the Comparative Compound 4, and the test specimen was irradiated with 55,000 Lux light. The time T elapsed until the percentage of the absorption retention decreased to 50% with respect to the absorption at λmax before irradiation in the UV absorption spectrum was measured.

Each test specimen prepared using the cyanine compound shown in Table 2 was irradiated with 55,000 Lux light for the same period of time as the above-described time T, subsequently, the absorption retention at λmax before irradiation in the UV absorption spectrum was measured. The results are shown in Table 2.

TABLE 2

| No. | Compound | Absorption Retention (%) |
| --- | --- | --- |
| Evaluation Example 2-1 | Compound No. 1 | 91 |
| Evaluation Example 2-2 | Compound No. 2 | 97 |
| Evaluation Example 2-3 | Compound No. 3 | 92 |
| Comparative Evaluation Example 2-1 | Comparative compound No. 1 | 91 |
| Comparative Evaluation Example 2-2 | Comparative compound No. 2 | 87 |
| Comparative Evaluation Example 2-3 | Comparative compound No. 3 | 92 |

Evaluation Example 3

The blend shown below was melt-kneaded with a plast-mill at 260° C. for 5 minutes. Subsequently, the blend was extruded through a nozzle having a diameter of 6 mm and pelletized using a water-cooled pelletizer to obtain dye-containing pellets. The pellets were molded into a 0.25 mm thick plate with an electric press at 250° C. The thin plate was subjected to the measurement with a U-3010 spectrophotometer manufactured by Hitachi, Ltd. The results were: λmax was 642 nm and the half-width was 25 nm.

| Blend | |
|---|---|
| "Upiron S-3000" (Mitsubishi Gas Chemical Co., Ltd.; polycarbonate resin) | 100 g |
| Compound No. 1 | 0.01 g |

Evaluation Example 4

A UV varnish was prepared from the blend shown below. The UV varnish was coated with a No. 9 bar coater on a 188 μm thick polyethylene terephthalate film that was treated for easy adhesion, and dried at 80° C. for 30 sec. Subsequently, UV light from a high pressure mercury lamp equipped with an infrared cut-off film filter was irradiated at 100 mJ so as to obtain a film having a cured thickness of about 5 μm. The film was subjected to the measurement with a U-3010 spectrophotometer manufactured by Hitachi, Ltd. The results were: λmax was 641 nm and the half-width was 25 nm.

| Blend | |
|---|---|
| "ADEKA OPTOMER KRX-571-65" (ADEKA Corp.; UV curing resin, having 80 wt % of resin content) | 100 g |
| Compound No. 1 | 0.5 g |
| Methylethylketone | 60 g |

Evaluation Example 5

A binder composition was prepared from the blend shown below. The composition was coated with a No. 9 bar coater on a 188 μm thick polyethylene terephthalate (PET) film that was treated for easy adhesion, and dried at 80° C. for 30 sec. Subsequently, the film was heat-pressed on a 0.9 mm thick alkali glass plate at 100° C. to obtain a PET protected glass plate that contained a light absorber in the binder layer between the glass plate and the PET film. The PET protected glass plate was subjected to the measurement with a U-3010 spectrophotometer manufactured by Hitachi, Ltd. The results were: λmax was 593 nm and the half-width was 29 nm.

| Blend | |
|---|---|
| "ADEKA ARKLS R-103" (ADEKA Corp.; acrylic resin binder, having 50 wt % of resin content) | 100 g |
| Compound No. 2 | 0.1 g |

Evaluation Example 6

A test specimen was prepared using the compound No. 2 according to the same way in Evaluation Example 2. A UV absorption spectrum and a UV reflection spectrum at an incident angle of 5° were measured for the thin layer of the test specimen. The results were: the absorption λmax was 617 nm and the reflection λmax was 644 nm.

The results of Evaluation Examples 1 and 2 show that the cyanine compound of the present invention is excellent in solubility and lightfastness. Further, the cyanine compound of the present invention has a high molar absorption coefficient (Examples 5 to 7) and, therefore, is clearly suitable for an optical filter and optical recording material. This is also clear from Evaluation Examples 3 to 6.

Industrial Applicability

According to the present invention, a novel cyanine compound excellent in solubility and lightfastness suitable as optical elements can be provided. The optical filter using the cyanine compound is suitable as an optical filter for image displaying. The optical recording material containing the cyanine compound is suitably used for forming an optical recording layer of an optical recording medium.

The invention claimed is:

1. A cyanine compound represented by general formula (VI) or (VII):

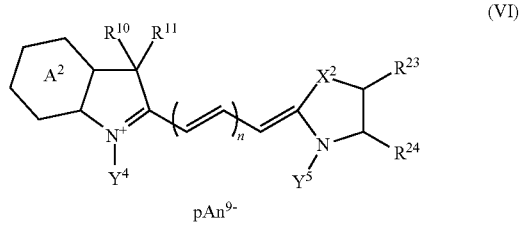

(VI)

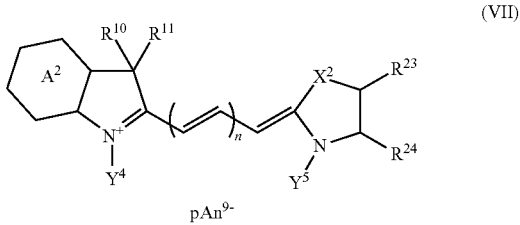

(VII)

wherein:

ring-$A^2$ is an optionally substituted benzene or naphthalene ring;

$Y^4$ and $Y^5$ each are independently a hydrogen atom, an organic group having 1 to 30 carbon atoms or a substituent represented by general formula (IV);

$X^2$ is an oxygen atom, a sulfur atom, a selenium atom, —$CR^3R^4$—, —NH—, or —NY'—;

$R^{10}$ is a hydrogen atom, a halogen atom, an alkyl group having 1 to 8 carbon atoms, an alkoxy group having 1 to 8 carbon atoms, or an aryl group having 6 to 30 carbon atoms;

$R^{11}$ is a substituent represented by general formula (IV);

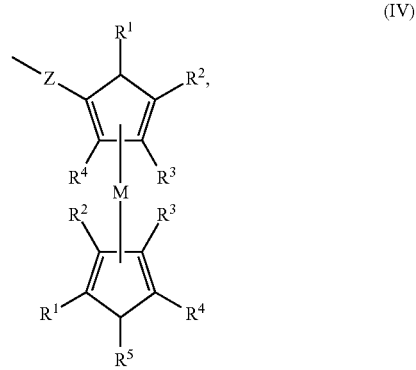

(IV)

wherein, each of $R^a$ to $R^i$ is independently a hydrogen atom or an alkyl group having 1 to 4 carbon atoms; a methylene group in the alkyl group having 1 to 4 carbon atoms may be replaced by —O— or —CO—; Z is a direct bond or an optionally substituted alkylene group having 1 to 8 carbon atoms; a methylene group in the alkylene group having 1 to 8 carbon atoms may be replaced by —O—, —S—, —CO—, —COO—, —OCO—, —SO$_2$—, —NH—, —CONH—, —NHCO—, —N=CH—, or —CH=CH—; and M is Fe, Co, Ni, Ti, Cu, Zn, Zr, Cr, Mo, Os, Mn, Ru, Sn, Pd, Rh, Pt, or Ir;

$R^{23}$ and $R^{24}$ each are independently a hydrogen atom, a halogen atom, an alkyl group having 1 to 8 carbon atoms, an alkoxy group having 1 to 8 carbon atoms, or an aryl group having 6 to 30 carbon atoms, and $R^{23}$ and $R^{24}$ may link together to form a ring structure n is an integer of 0 to 6;

the polymethine chain may have a substituent;

$An^{q-}$ is a q-valent anion;

q is 1 or 2; and p is a factor keeping a neutrality of charge.

2. The cyanine compound according to claim 1, wherein:

the ring-$A^2$ in general formula (VII) is an optionally substituted benzene ring;

$R^{23}$ and $R^{24}$ in general formula (VII) link together to form an optionally substituted benzene ring;

$X^2$ in general formula (VII) is —$CR^3R^4$—;

Z in general formula (IV) is an optionally substituted alkylene group having 1 to 8 carbon atoms; and M in general formula (IV) is Fe.

3. The cyanine compound according to claim 1, wherein n is 1 or 2.

* * * * *